(12) United States Patent
Liu et al.

(10) Patent No.: US 9,728,197 B2
(45) Date of Patent: Aug. 8, 2017

(54) METHOD AND DEVICE FOR ENCODING A HIGH FREQUENCY SIGNAL, AND METHOD AND DEVICE FOR DECODING A HIGH FREQUENCY SIGNAL

(71) Applicant: HUAWEI TECHNOLOGIES CO.,LTD., Shenzhen, Guangdong (CN)

(72) Inventors: Zexin Liu, Beijing (CN); Lei Miao, Beijing (CN); Anisse Taleb, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/879,388

(22) Filed: Oct. 9, 2015

(65) Prior Publication Data
US 2016/0035364 A1    Feb. 4, 2016

Related U.S. Application Data

(63) Continuation of application No. 14/057,646, filed on Oct. 18, 2013, now Pat. No. 9,161,038, which is a
(Continued)

(30) Foreign Application Priority Data

Sep. 29, 2010    (CN) .......................... 2010 1 0298711

(51) Int. Cl.
*G10L 19/032*    (2013.01)
*G10L 21/038*    (2013.01)
(Continued)

(52) U.S. Cl.
CPC ............ *G10L 19/032* (2013.01); *G10L 19/20* (2013.01); *G10L 21/038* (2013.01); *G10L 25/18* (2013.01); *H04N 19/60* (2014.11); *G10L 19/025* (2013.01)

(58) Field of Classification Search
USPC .................................. 704/200–230, 500–504
See application file for complete search history.

(56) References Cited

U.S. PATENT DOCUMENTS

| 5,602,959 A | 2/1997 | Bergstrom et al. |
| 5,884,253 A | 3/1999 | Kleijn |

(Continued)

FOREIGN PATENT DOCUMENTS

| AU | 2007312667 B2 | 4/2008 |
| CN | 1602516 A | 3/2005 |

(Continued)

OTHER PUBLICATIONS

"Subpart 4: General Audio Coding (GA)—AAC, TwinVQ, BSAC", ISO/IEC 14496-3:200X(E), 2009, total 405 pages.
(Continued)

*Primary Examiner* — Abul Azad
(74) *Attorney, Agent, or Firm* — Huawei Technologies Co., Ltd.

(57) ABSTRACT

A method and a device for encoding a high frequency signal, and a method and a device for decoding a high frequency signal are provided, which relate to encoding and decoding technology. The method for encoding a high frequency signal includes: determining a signal type of a high frequency signal of a current frame; smoothing and scaling time envelopes of the high frequency signal of the current frame and obtaining time envelopes of the high frequency signal of the current frame that require to be encoded, if the high frequency signal of the current frame is a non-transient signal and a high frequency signal of the previous frame is a transient signal; and quantizing and encoding the time envelopes of the high frequency signal of the current frame
(Continued)

that require to be encoded, and frequency information and signal type information of the high frequency signal of the current frame.

25 Claims, 8 Drawing Sheets

Related U.S. Application Data continuation of application No. 13/854,043, filed on Mar. 29, 2013, now Pat. No. 8,924,221, which is a continuation of application No. PCT/CN2010/078977, filed on Nov. 23, 2010.

(51) Int. Cl.
*G10L 19/20* (2013.01)
*H04N 19/60* (2014.01)
*G10L 25/18* (2013.01)
*G10L 19/025* (2013.01)

(56) References Cited

U.S. PATENT DOCUMENTS

| | | | |
|---|---|---|---|
| 6,266,644 B1* | 7/2001 | Levine | G10L 19/20 704/200.1 |
| 8,063,809 B2 | 11/2011 | Liu et al. | |
| 8,103,515 B2 | 1/2012 | Chen et al. | |
| 8,924,221 B2* | 12/2014 | Liu | G10L 21/038 704/500 |
| 9,161,038 B2* | 10/2015 | Liu | G10L 21/038 |
| 2005/0073986 A1 | 4/2005 | Kondo et al. | |
| 2005/0267741 A1 | 12/2005 | Laaksonen et al. | |
| 2008/0120116 A1 | 5/2008 | Schnell et al. | |
| 2010/0004934 A1 | 1/2010 | Hirose et al. | |
| 2011/0099018 A1 | 4/2011 | Neuendorf et al. | |
| 2011/0194598 A1 | 8/2011 | Miao et al. | |
| 2011/0238427 A1 | 9/2011 | Chen et al. | |
| 2013/0010985 A1 | 1/2013 | Disch et al. | |

FOREIGN PATENT DOCUMENTS

| | | |
|---|---|---|
| CN | 1985304 A | 6/2007 |
| CN | 101529503 A | 9/2009 |
| CN | 101751926 A | 6/2010 |
| CN | 101763856 A | 6/2010 |
| WO | 2008046505 A1 | 4/2008 |
| WO | 2011110031 A1 | 9/2011 |

OTHER PUBLICATIONS

"G.729-based embedded variable bit-rate coder: An 8-32 kbit/s scalable wideband coder bitstream interoperable with G.729", ITU-T G.729.1, May 2006, total 100 pages.

* cited by examiner

METHOD AND DEVICE FOR ENCODING A HIGH FREQUENCY SIGNAL, AND METHOD AND DEVICE FOR DECODING A HIGH FREQUENCY SIGNAL

CROSS-REFERENCE TO RELATED APPLICATIONS

This application is a continuation of U.S. patent application Ser. No. 14/057,646, filed on Oct. 18, 2013. The U.S. patent application Ser. No. 14/057,646 is a continuation of U.S. patent application Ser. No. 13/854,043, filed on Mar. 29, 2013, now U.S. Pat. No. 8,924,221. The U.S. patent application Ser. No. 13/854,043 is a continuation of International Application No. PCT/CN2010/078977, filed on Nov. 23, 2010, which claims priority to Chinese Patent Application 201010298711.3, filed on Sep. 29, 2010. The afore-mentioned patent applications are hereby incorporated by reference in their entireties.

TECHNICAL FIELD

The present invention relates to encoding and decoding technology, and in particular, to a method and a device for encoding a high frequency signal, and a method and a device for decoding a high frequency signal.

BACKGROUND

In a speech and audio encoding algorithm, due to the limitation of the bit rate and the characteristics of the hearing sense of human beings, low frequency signals are normally encoded with priority, whereas high frequency signals are sometimes discarded. With the development of communication network, the limitations of bandwidth become less severe, so that higher requirements on tone quality can be met. The tone quality of signals can be well improved by increasing signal bandwidth, that is, by restoring the high frequency signals. When no bit or only a few bits are available, a bandwidth expansion technique is used. The bandwidth expansion technique is a technique of expanding the speech and audio signal bandwidth range to improve the signal quality. In recent years, the bandwidth expansion technique has been developed quickly, and it is commercially applied in some fields. The bandwidth expansion algorithm in G.729.1 and the Spectral Band Replication (SBR) in the Moving Picture Experts Group (MPEG) are two bandwidth expansion algorithms that are extensively used in speech and audio compression presently.

The high frequency signals can be classified into transient signals and non-transient signals. A transient signal is a signal whose energy level has large instant changes in the time domain. In an existing method for encoding high frequency signals, when a high frequency signal is encoded, a transient signal and a non-transient signal can be encoded in different manners. But due to the development of the time-frequency transformation technique, the method for encoding a high frequency signal may no longer be compatible with the current time-frequency transformation technique. Therefore, the existing method for encoding a high frequency signal may degrade the performance of transient signals.

In an existing method for decoding a high frequency signal, a high frequency excitation spectrum is normalized according to a calculated length of a frequency envelope. As a result, the deviation of the characteristics of the restored high frequency signal from the characteristics of the actual high frequency signal can be very large.

SUMMARY

The embodiments of the present invention provide a method and a device for encoding a high frequency signal, and a method and a device for decoding a high frequency signal, so as to improve the performance of a transient signal and reduce the deviation of the characteristics of a restored high frequency signal from the characteristics of an actual high frequency signal.

An embodiment of the present invention provides a method for encoding a high frequency signal, where the method includes:

determining a signal type of a high frequency signal of a current frame; and smoothing and scaling time envelopes of the high frequency signal of the current frame, and obtaining the time envelopes of the high frequency signal of the current frame that require to be encoded, if the high frequency signal of the current frame is a non-transient signal, and a high frequency signal of a previous frame is a transient signal; and quantizing and encoding the time envelopes of the high frequency signal of the current frame that require to be encoded, and frequency information and signal type information of the high frequency signal of the current frame, where the signal type information of a transient signal is used when the signal type information of the high frequency signal of the current frame is quantized and encoded.

Another embodiment of the present invention provides a method for encoding a high frequency signal, where the method includes:

dividing a full frequency or high frequency time domain signal of a current frame into at least two sub-frames;

calculating energy information or amplitude information of each of the sub-frames;

calculating energy information or amplitude information of sub-frames included in the first half frame of a next frame if the energy information or amplitude information of any one of the sub-frames of the current frame is greater than a first preset multiple of the energy information or amplitude information of a previous sub-frame of the sub-frame;

finding the minimum energy information or amplitude information in the following information: the energy information or amplitude information of all the sub-frames that are behind a sub-frame of the current frame, where the sub-frame has the maximum energy information or amplitude information in the current frame, and the energy information or amplitude information of the sub-frames included in the first half frame of the next frame;

judging whether the maximum energy information or amplitude information is greater than or equal to a second preset multiple of the minimum energy information or amplitude information, where the second preset multiple is greater than 1, and the first preset multiple is greater than 1; and determining a high frequency signal of the current frame as a transient signal when the maximum energy information or amplitude information is greater than or equal to the second preset multiple of the minimum energy information or amplitude information, and quantizing and encoding time envelopes, frequency information, and signal type information of the high frequency signal of the current frame.

Another embodiment of the present invention provides a method for encoding a high frequency signal, where the method includes:

dividing a full frequency or high frequency time domain signal of a current frame into at least two sub-frames;

calculating energy information or amplitude information of each of the sub-frames;

judging whether the spectral tilt of the current frame is smaller than or equal to a first threshold value if the energy information or amplitude information of any one of the sub-frames of the current frame is greater than a first preset multiple of the energy information or amplitude information of a previous sub-frame of the any one of the sub-frames; where the first preset multiple is greater than 1; and determining a high frequency signal of the current frame as a transient signal when a spectral tilt of the current frame is smaller than or equal to the first threshold value.

Another embodiment of the present invention provides a method for decoding a high frequency signal, where the method includes:

obtaining signal type information and frequency information of a high frequency signal of a current frame by decoding;

obtaining a high frequency excitation spectrum of the current frame; determining normalization length according to the signal type of the high frequency signal of the current frame and low frequency signal information; and obtaining a normalized high frequency excitation spectrum by normalizing the high frequency excitation spectrum according to the normalization length;

modifying the normalized high frequency excitation spectrum by using the frequency information, and obtaining a high frequency spectrum of the current frame; and outputting an output signal obtained by using the high frequency spectrum of the current frame.

Another embodiment of the present invention provides a device for encoding a high frequency signal, where the device includes:

a determination unit, configured to determine a signal type of a high frequency signal of a current frame; and an encoding processing unit, configured to smooth and scale time envelopes of the high frequency signal of the current frame, and obtain time envelopes of the high frequency signal of the current frame that require to be encoded, when the determination unit determines that the high frequency signal of the current frame is a non-transient signal, but a high frequency signal of a previous frame is a transient signal; and quantize and encode the time envelopes of the high frequency signal of the current frame that require to be encoded, and frequency information and signal type information of the high frequency signal of the current frame, where signal type information of a transient signal is used when the signal type information of the high frequency signal of the current frame is quantized and encoded.

Another embodiment of the present invention provides a device for encoding a high frequency signal, where the device includes:

a division unit, configured to divide a full frequency or high frequency time domain signal of a current frame into at least two sub-frames;

a calculation processing unit, configured to calculate energy information or amplitude information of each of the sub-frames of the current frame divided by the division unit; calculate energy information or amplitude information of sub-frames included in the first half frame of a next frame when a judgment unit judges that the energy information or amplitude information of any one of the sub-frames of the current frame is greater than a first preset multiple of the energy information or amplitude information of a previous sub-frame of the sub-frame; and find the minimum energy information or amplitude information in the following information: the energy information or amplitude information of all the sub-frames that are behind a sub-frame of the current frame, where the sub-frame has the maximum energy information or amplitude information in the current frame, and the energy information or amplitude information of the sub-frames included in the first half frame of the next frame;

the judgment unit, configured to judge whether the energy information or amplitude information of the current sub-frame calculated by the calculation processing unit is greater than the first preset multiple of the energy information or amplitude information of the previous sub-frame; judge whether the energy information or amplitude information of the sub-frame having the maximum energy information or amplitude information is greater than or equal to a second preset multiple of the minimum energy information or amplitude information found by the calculation processing unit, where the second preset multiple is greater than 1, and the first preset multiple is greater than 1;

a determination unit, configured to determine a high frequency signal of the current frame as a transient signal when the judgment unit judges that the energy information or amplitude information of the sub-frame having the maximum energy information or amplitude information is greater than or equal to the second preset multiple of the minimum energy information or amplitude information found by the calculation processing unit; and an encoding processing unit, configured to quantize and encode time envelopes, frequency information, and signal type information of the high frequency signal of the current frame when the determination unit determines that the high frequency signal of the current frame is a transient signal.

Another embodiment of the present invention provides a device for encoding a high frequency signal, where the device includes:

a division unit, configured to divide a full frequency or high frequency time domain signal of a current frame into at least two sub-frames;

a calculation processing unit, configured to calculate energy information or amplitude information of each of the sub-frames of the current frame divided by the division unit;

a judgment unit, configured to judge whether energy information or amplitude information of any one of the sub-frames of the current frame calculated by the calculation processing unit is greater than a first preset multiple of energy information or amplitude information of a previous sub-frame; and judge whether a spectral tilt of the current frame is smaller than or equal to a first threshold value, if the energy information or amplitude information of any one of the sub-frames of the current frame is greater than the first preset multiple of the energy information or amplitude information of the previous sub-frame of the sub-frame; where the first preset multiple is greater than 1;

a determination unit, configured to determine a high frequency signal of the current frame as a transient signal only when the judgment unit judges that a spectral tilt of the current frame is smaller than or equal to the first threshold value; and an encoding processing unit, configured to quantize and encode time envelopes, frequency information, and signal type information of the high frequency signal of the current frame when the determination unit determines that the high frequency signal of the current frame is a transient signal.

Another embodiment of the present invention provides a device for decoding a high frequency signal, where the device includes:

a decoding unit, configured to obtain signal type information and frequency information of a high frequency signal of a current frame by decoding;

an obtaining unit, configured to obtain a high frequency excitation spectrum of the current frame;

a normalization unit, configured to determine normalization length according to the signal type of the high frequency signal of the current frame obtained by the decoding unit and low frequency signal information, and obtain a normalized high frequency excitation spectrum by normalizing the high frequency excitation spectrum obtained by the obtaining unit according to the normalization length;

a high frequency spectrum obtaining unit, configured to modify the normalized high frequency excitation spectrum obtained by the normalization unit by using the frequency information obtained by the decoding unit, and obtain a high frequency spectrum; and an output processing unit, configured to obtain an output signal obtained by using the high frequency spectrum of the current frame obtained by the high frequency spectrum obtaining unit, and output the output signal.

In view of the above technical solutions provided by the embodiments of the present invention, when a high frequency signal of the current frame is a non-transient signal, and a previous frame of the non-transient signal is a transient signal, the current frame may be processed as a transient signal, so that the performance of the transient signal is improved.

BRIEF DESCRIPTION OF THE DRAWINGS

To illustrate the technical solutions according to the embodiments of the present invention or in the prior art more clearly, the accompanying drawings for describing the embodiments or the prior art are described briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention is clearly described in the following with reference to the accompanying drawings. It is obvious that the embodiments to be described are only a part rather than all the embodiments of the present invention. All other embodiments obtained by persons skilled in the art based on the embodiments of the present invention described herein without creative efforts shall fall within the protection scope of the present invention.

Figure 1:
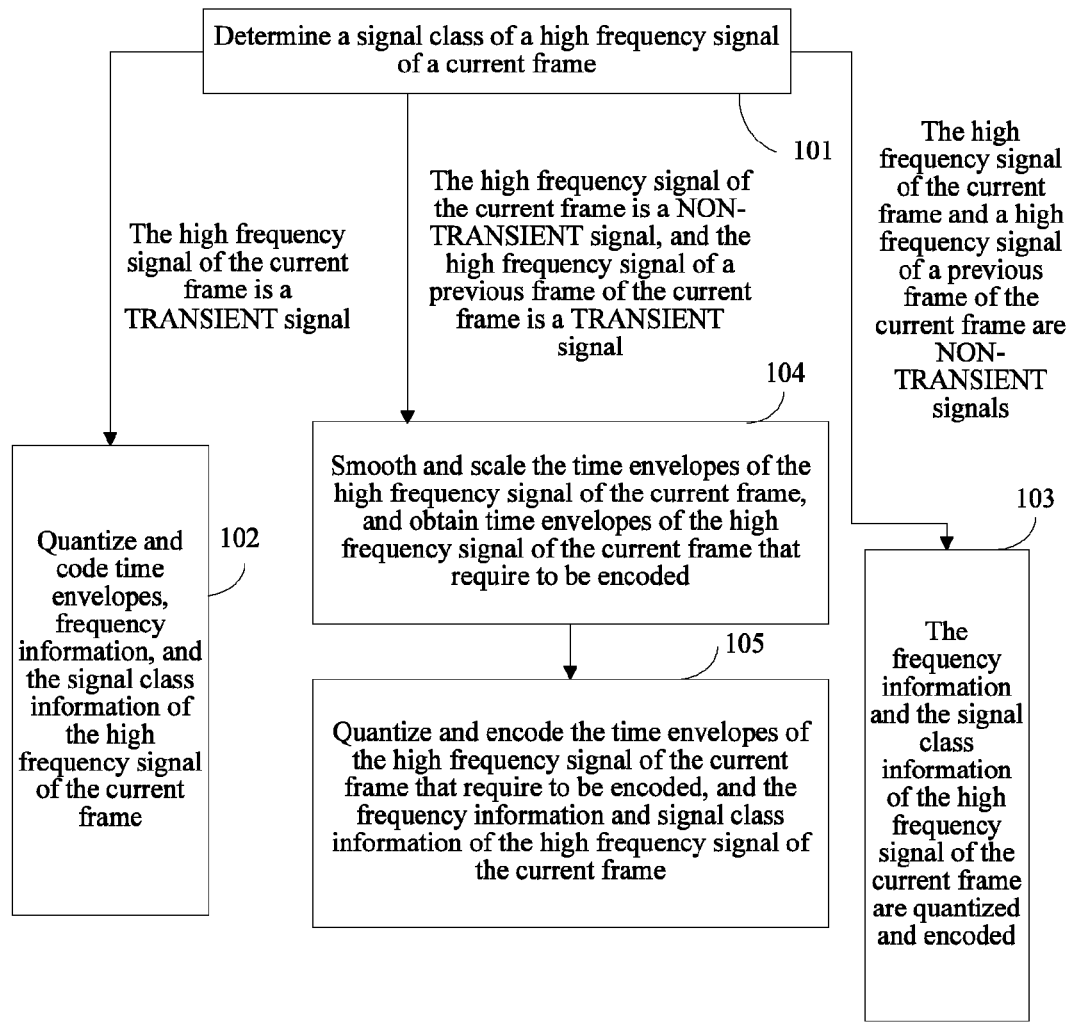
FIG. 1 is a flow chart of a method for encoding a high frequency signal according to an embodiment of the present invention.

Methods for encoding a high frequency signal provided in embodiments of the present invention are described below first. FIG. 1 is a flow chart of the method for encoding a high frequency signal according to an embodiment of the present invention. The embodiment includes the following steps.

Step 101: Determine a signal type of a high frequency signal of a current frame. If the high frequency signal of the current frame is a transient signal, the procedure proceeds to step 102; if both the high frequency signal of the current frame and a high frequency signal of a frame that is previous to the current frame (hereafter referred to as previous frame) are non-transient signals, the procedure proceeds to step 103; and if the high frequency signal of the current frame is a non-transient signal, and the high frequency signal of the previous frame is a transient signal, the procedure proceeds to step 104.

In an embodiment of the present invention, the following method is used for determining signal type information of the high frequency signal of the current frame. A full frequency or high frequency time domain signal of the current frame is divided into at least two sub-frames.

Energy information or amplitude information of each of the sub-frames of the current frame is calculated. In an embodiment of the present invention, the energy information or amplitude information of a current sub-frame is calculated according to the following equation:

$$E(j) = \sum_{n=0}^{N-1} S(j \times N + n)^2 \quad j = 0, \ldots M - 1 \quad (1)$$

where M is the number of the sub-frames the current frame is divided into, and N is the length of the sub-frame. When the energy information or amplitude information of the sub-frames of the current frame is calculated, the energy information or amplitude information of the sub-frame that has the maximum energy information or amplitude information among all the sub-frames of the current frame is saved, that is, the information calculated according to the following equation is saved:

$$E_{max}=\max(E(j))\ j=0,\ldots M-1 \qquad (2)$$

Whether the energy information or amplitude information of the current sub-frame is greater than a first preset multiple of the energy information or amplitude information of a previous sub-frame is judged, where the first preset multiple is greater than 1. That is, whether $E(j)>\delta*E(j-1)$ is judged, where $E(j)$ is the energy information or amplitude information of the current sub-frame, $E(j-1)$ is the energy information or amplitude information of the previous sub-frame, and $\delta$ is a preset value greater than 1. When the current sub-frame is the first sub-frame of the current frame, the previous sub-frame is the last sub-frame of the previous frame.

If $E(j)>\delta*E(j-1)$ the high frequency signal of the current frame is determined as a transient signal; otherwise, the high frequency signal of the current frame is determined as a non-transient signal. If the energy information or amplitude information of any the sub-frames of the current frame is smaller than or equal to the first preset multiple of the energy information or amplitude information of a previous sub-frame of the sub-frame, the high frequency signal of the current frame is determined as a non-transient signal.

In another embodiment of the present invention, a weighted sum of the energy information or amplitude information of the previous sub-frame and the current sub-frame may be used to update the energy information or amplitude information of the previous sub-frame, that is: update to the information calculated according to the following equation:

$$E(j)=\alpha*E(j-1)+\beta*E(j),\ \alpha+\beta=1 \qquad (3)$$

Therefore, when whether the energy information or amplitude information of the current sub-frame is greater than the first preset multiple of the energy information or amplitude information of the previous sub-frame is judged, the energy information or amplitude information of the previous sub-frame to be used may be the weighted and updated energy information or the weighted and updated amplitude information.

In another embodiment of the present invention, when $E(j)>\delta*E(j-1)$, energy information or amplitude information of sub-frames included in the first half frame of a next frame is calculated. The minimum energy information or amplitude information is found in the following information: the energy information or amplitude information of all the sub-frames that are behind a sub-frame of the current frame, where the sub-frame has the maximum energy information or amplitude information in the current frame, and the energy information or amplitude information of the sub-frames included in the first half frame of the next frame. When the energy information or amplitude information of the sub-frames included in the first half frame of the next frame is calculated, only the energy information or amplitude information of one sub-frame may be calculated, or the energy information or amplitude information of all the sub-frames included in the first half frame of the next frame may be calculated respectively.

Then, whether the energy information or amplitude information of the sub-frame having the maximum energy information or amplitude information is greater than or equal to a second preset multiple of the found minimum energy information or amplitude information is judged, where the second preset multiple is greater than 1. That is, whether $E_{max} \geq \epsilon*E_{LH}$ is judged, where $\epsilon$ is a preset value greater than 1. Only when $E(j)>\delta*E(j-1)$ and $E_{max} \geq \epsilon*E_{LH}$, the high frequency signal of the current frame is determined as a transient signal.

In another embodiment of the present invention, when $E(j)>\delta*E(j-1)$ and $E_{max} \geq \epsilon*E_{LH}$, whether a spectral tilt of the current frame is smaller than or equal to a first threshold value is further judged. Only when the spectral tilt of the current frame is smaller than or equal to the first threshold value, $E(j)>\delta*E(j-1)$ and $E_{max} \geq \epsilon*E_{LH}$, the high frequency signal of the current frame is determined as a transient signal. If the spectral tilt of the current frame is greater than the first threshold value, the current frame is fricative. The first threshold value may be a preset value greater than 1.

In another embodiment of the present invention, when $E(j)>\delta*E(j-1)$ whether the spectral tilt of the current frame is smaller than or equal to the first threshold value is further judged. Only when the spectral tilt of the current frame is smaller than or equal to the first threshold value and $E(j)>\delta*E(j-1)$ the high frequency signal of the current frame is determined as a transient signal. If the spectral tilt of the current frame is greater than the first threshold value, the current frame is a fricative. The first threshold value may be a preset value greater than 1.

In another embodiment of the present invention, if the current frame is determined as a non-transient signal, whether the current frame is a harmonic signal, a noise signal, or a normal signal can further be judged according to the peak-to-average ratio of each sub-band of high frequency spectrum. The harmonic signal refers to a high frequency signal, the spectrum of which includes strong harmonic components. That is, a spectrum includes some spectral peaks, and the peak-to-average ratio of the spectrum in certain sub-bands is large. The noise signal refers to a high frequency signal, of which the spectrum is relatively flat, spectral energy changes slowly, the spectrum does not include harmonic components, and the peak-to-average ratio of the spectrum in certain sub-bands is small. The normal signal refers to a high frequency signal, of which the spectrum includes a few harmonic waves, but the harmonic waves are relatively weak, and the peak-to-average ratio is within a certain range (specifically, the peak-to-average ratio is between that of the harmonic signal and that of the noise signal).

The peak-to-average ratio of a high frequency spectral coefficient can be calculated as follows:

$$\text{sharp}(j) = \frac{(N-1) \times A_{sharp}(j)}{\sum_{k=N*j}^{N*j+N-1} |S_{SHB}(k)| - A_{sharp}(j)}, \text{ where} \qquad (4)$$

$$\left( \sum_{k=N*j}^{N*j+N-1} |S_{SHB}(k)| \right) != A_{sharp}(j)$$

$A_{sharp}(j)$ is the spectral coefficient having the maximum amplitude in the $j^{th}$ sub-band, $$\sum_{k=N*j}^{N*j+N-1} |S_{SHB}(k)|$$

is the sum of the amplitude of all the spectral coefficients in the $j^{th}$ sub-band, and N is the number of the spectral coefficients in the $j^{th}$ sub-band.

In another embodiment of the present invention, the non-transient signal can be divided into the harmonic signal, the noise signal, and the normal signal according to the peak-to-average ratio of the high frequency spectral coefficients and low frequency information. The low frequency information may be classification information of a low frequency or some parameters extracted from the low frequency.

Step 102: Quantize and encode time envelopes, frequency information, and the signal type information of the high frequency signal of the current frame. The procedure ends.

The signal type may be indicated by numerals. For example, 1 is used to indicate a transient signal.

In another embodiment of the present invention, the frequency information of the high frequency signal of the current frame (a transient signal) at least includes global energy information or amplitude information of the high frequency signal of the current frame (a transient signal). The global energy information or amplitude information of the high frequency signal of the current frame (a transient signal) may further be scaled before the frequency information of the high frequency signal of the current frame (a transient signal) including the global energy information or amplitude information of the high frequency signal of the current frame (a transient signal) is quantized and encoded.

The scaling of the global energy information or amplitude information may be performed by directly multiplying the global energy information or amplitude information with a preset value $\epsilon$, where $\epsilon$ is greater than 0 and smaller than 1. It can be represented by:

$$\hat{g}_{rms}(j) = \hat{g}_{rms}(j) * \epsilon \quad 0 < \epsilon < 1 \quad (5)$$

In another embodiment of the present invention, the frequency information of the high frequency signal of the current frame (a transient signal) at least includes frequency envelopes of the high frequency signal of the current frame (a transient signal). The frequency envelopes of the high frequency signal of the current frame (a transient signal) may further be scaled before the frequency information of the high frequency signal of the current frame (a transient signal) including the frequency envelopes of the high frequency signal of the current frame (a transient signal) is quantized and encoded. The scaling of the frequency envelopes may be performed by directly multiplying the frequency envelopes with a preset value $\epsilon$, where $\epsilon$ is greater than 0 and smaller than 1.

In another embodiment of the present invention, before the time envelopes of the high frequency signal of the current frame (a transient signal) are quantized and encoded, the time envelopes of the high frequency signal of the current frame (a transient signal) may be processed as follows. The high frequency signal of the current frame (a transient signal) is divided into at least two sub-frames. A time envelope of each of the sub-frames is calculated. The maximum time envelope among the time envelopes of all sub-frames is increased to $\beta$ times of the maximum time envelope. The time envelope corresponding to each of the sub-frames before the sub-frame having the maximum time envelope is decreased to a times of the time envelope corresponding to each of the sub-frames. If the average value of the time envelopes of all the sub-frames that are behind the sub-frame having the maximum time envelope is smaller than $\gamma$ times of the maximum time envelope, the time envelope of each of the sub-frames that are behind the sub-frame having the maximum time envelope is also decreased to a times of the time envelopes corresponding to each of the sub-frames; otherwise, the time envelope of each of the sub-frames that are behind the sub-frame having the maximum time envelope is not processed. And, $\beta>1$, $0<\alpha<1$, and $0<\gamma<1$.

The processing of the time envelope of each of the sub-frames can be represented by the following equation:

$$t_{rms}(j) = \begin{cases} t_{rms}(j) * \beta, & j = idx_{tenv,max} \\ t_{rms}(j) * \alpha, & j < idx_{tenv,max} \\ t_{rms}(j) * \alpha, & j > idx_{tenv,max}, avr_{after,max} < \gamma * t_{rms}(idx_{tenv,max}) \end{cases} \quad (6)$$

where $\beta>1$, $0<\alpha<1$, $0<\gamma<1$, $j=0, \ldots, N-1$, $idx_{tenv,max}$ is an index of the sub-frame of the maximum time envelope, and $avr_{after,max}$ is the average value of the time envelopes of all the sub-frames that are behind the sub-frame having the maximum time envelope.

Step 103: The frequency information and the signal type information of the high frequency signal of the current frame are quantized and encoded. The procedure ends.

In another embodiment of the present invention, when the high frequency signal of the current frame and the high frequency signal of the previous frame are non-transient signals, a specific type of the non-transient signal corresponding to the high frequency signal of the current frame (a non-transient signal) can further be determined. For example, in an embodiment of the present invention, specifically, the non-transient signal corresponding to the high frequency signal of the current frame (a non-transient signal) may be determined as a harmonic signal, a noise signal, or a normal signal.

The specific type of the non-transient signal can be indicated by numerals. For example, 2 is used to indicate the harmonic signal, 3 is used to indicate the noise signal, and 4 is used to indicate the normal signal.

Step 104: Smooth and scale the time envelopes of the high frequency signal of the current frame, and obtain time envelopes of the high frequency signal of the current frame that require to be encoded.

The sequence of performing the smoothing of the time envelopes of the high frequency signal of the current frame and the scaling of the time envelopes of the high frequency signal of the current frame is not limited. In an embodiment of the present invention, the time envelopes of the high frequency signal of the current frame are smoothed first, and then the smoothed time envelopes of the high frequency signal of the current frame are scaled. In another embodiment of the present invention, the time envelopes of the high frequency signal of the current frame are scaled first, and then the scaled time envelopes of the high frequency signal of the current frame are smoothed.

Specifically, the time envelopes of the high frequency signal of the current frame may be smoothed in the current frame or between the current frame and a neighboring frame. Such smoothing of the time envelopes of the current frame can make the transition of time envelopes smoother.

The time envelope $t_{rms}(j)$ can be calculated according to the following equation:

$$t_{rms}(j) = \sqrt{\frac{1}{N} \sum_{n=0}^{N-1} S_H(j \times N + n)^2} \quad (7)$$

where $S_H(\ )$ is the high frequency time domain signal, and $j=0, \ldots, N-1$.

In an embodiment of the present invention, specifically, the time envelopes of the high frequency signal of the current frame may be scaled by decreasing the time envelopes of all the sub-frames of the current frame by a certain number of multiple. That is $$t_{rms}(j) = t_{rms}(j) * \alpha, \text{ where } 0 < \alpha < 1 \quad (8)$$

In another embodiment of the present invention, after the time envelopes of the high frequency signal of the current frame are smoothed and scaled, time envelopes of the second half frame of the previous-frame high frequency signal and the smoothed and scaled the time envelopes of the first half frame of the current-frame high frequency signal may further be combined, and time envelopes obtained by the combination are regarded as the time envelopes of the high frequency signal of the current frame that require to be encoded.

Step 105: Quantize and encode the time envelopes of the high frequency signal of the current frame that require to be encoded, and the frequency information and signal type information of the high frequency signal of the current frame. Signal type information of a transient signal is used when the signal type information of the high frequency signal of the current frame is quantized and encoded.

The frequency information of the high frequency signal of the current frame includes the frequency envelopes and/or the global energy information or amplitude information of the high frequency signal of the current frame.

In an embodiment of the present invention, specifically, the frequency envelopes and the global energy information or amplitude information of the high frequency signal of the current frame may be calculated according to spectral coefficients of the high frequency signal.

The signal type information may be indicated by numerals. For example, 1 is used to indicate a transient signal.

When the signal type information of the high frequency signal of the current frame is quantized and encoded, the signal type information of the transient signal can guarantee that the high frequency signal of the current frame is processed by a decoder as a transient signal, so as to guarantee that the high frequency signal of the current frame obtained by the decoder is closer to the original signal, and the performance of the transient signal is improved. At the same time, the signal type information of the transient signal is used only when the signal type information of the high frequency signal of the current frame is quantized and encoded, so that the signal type of the high frequency signal of the current frame does not require to be changed at an encoder, and it is guaranteed that correct type information of a high frequency signal of a next frame is obtained.

In another embodiment of the present invention, when the frequency information of the high frequency signal of the current frame (the high frequency signal of the current frame is a non-transient signal, and the high frequency signal of the previous frame is a transient signal) at least includes the global energy information or amplitude information of the high frequency signal of the current frame (the high frequency signal of the current frame is a non-transient signal, and the high frequency signal of the previous frame is a transient signal), before the frequency information of the high frequency signal of the current frame (the high frequency signal of the current frame is a non-transient signal, and the high frequency signal of the previous frame is a transient signal) including the global energy information or amplitude information of the high frequency signal of the current frame (the high frequency signal of the current frame is a non-transient signal, and the high frequency signal of the previous frame is a transient signal) is quantized and encoded, the global energy information or amplitude information of the high frequency signal of the current frame (the high frequency signal of the current frame is a non-transient signal, and the high frequency signal of the previous frame is a transient signal) may further be scaled.

In another embodiment of the present invention, when the frequency information of the high frequency signal of the current frame (the high frequency signal of the current frame is a non-transient signal, and the high frequency signal of the previous frame is a transient signal) at least includes the frequency envelopes of the high frequency signal of the current frame (the high frequency signal of the current frame is a non-transient signal, and the high frequency signal of the previous frame is a transient signal), before the frequency information of the high frequency signal of the current frame (the high frequency signal of the current frame is a non-transient signal, and the high frequency signal of the previous frame is a transient signal) including the frequency envelopes of the high frequency signal of the current frame (the high frequency signal of the current frame is a non-transient signal, and the high frequency signal of the previous frame is a transient signal) is quantized and encoded, the frequency envelopes of the high frequency signal of the current frame (the high frequency signal of the current frame is a non-transient signal, and the high frequency signal of the previous frame is a transient signal) may further be scaled.

In view of the above, in this embodiment, when the high frequency signal of the current frame is a non-transient signal, and the previous frame of the non-transient signal is a transient signal, the current frame is processed as a transient signal, so that the performance of the transient signal is improved. Furthermore, in another embodiment of the present invention, the time envelopes of the current frame that require to be encoded may be formed by the time envelopes of the second half frame of the previous frame and the time envelopes of the first half frame of the current frame, so that the time envelops of the current frame are closer to a transient signal, and the performance of the transient signal is further improved. Furthermore, in another embodiment of the present invention, the high frequency signal of the current frame is determined as a transient signal only when the energy information or amplitude information of the current sub-frame is greater than the first preset multiple of the energy information or amplitude information of the previous sub-frame, and the energy information or amplitude information of the sub-frame having the maximum energy information or amplitude information is greater than or equal to the second preset multiple of the found minimum energy information or amplitude information, so that the accuracy of the determination of the transient signal is guaranteed. Furthermore, in another embodiment of the present invention, the high frequency signal of the current frame is determined as a transient signal only when the energy information or amplitude information of the current sub-frame is greater than the first preset multiple of the energy information or amplitude information of the previous sub-frame, the energy information or amplitude information of the sub-frame having the maximum energy information or amplitude information is greater than or equal to the second preset multiple of the found minimum energy information or amplitude information, and the spectral tilt of the current frame is smaller than or equal to the first threshold value, so that the accuracy of the determination of the transient signal is guaranteed. Furthermore, in another embodiment of the present invention, when the current frame is a transient signal, the global energy information or amplitude information of the high frequency signal of the current frame may be scaled, so that a pre-echo or a post-echo of the transient signal is reduced, and the performance of the transient signal is further improved.

Figure 2:
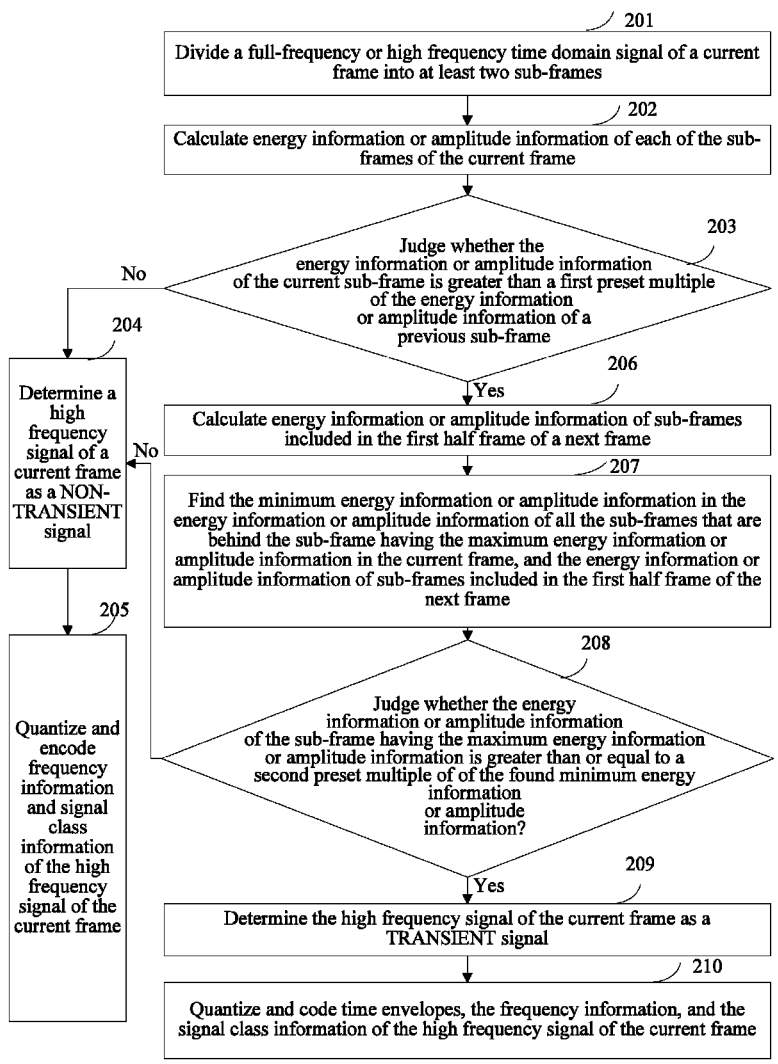
FIG. 2 is a flow chart of a method for encoding a high frequency signal according to another embodiment of the present invention.

FIG. 2 is a flow chart of a method for encoding a high frequency signal according to another embodiment of the present invention, and the embodiment includes the following steps:

Step 201: Divide a full frequency or high frequency time domain signal of a current frame into at least two sub-frames.

Step 202: Calculate energy information or amplitude information of each of the sub-frames of the current frame.

In an embodiment of the present invention, the energy information or amplitude information of a current sub-frame is calculated according to the following equation:

$$E(j) = \sum_{n=0}^{N-1} S(j \times N + n)^2 \quad j = 0, \ldots M-1 \quad (9)$$

where M is the number of the sub-frames the current frame is divided into, and N is the length of the sub-frame. When the energy information or amplitude information of the sub-frames of the current frame is calculated, the energy information or amplitude information of the sub-frame that has the maximum energy information or amplitude information among all the sub-frames of the current frame is saved, that is, the information calculated according to the following equation is saved:

$$E_{max} = \max(E(j))j=0, \ldots M-1 \quad (10)$$

Step 203: Judge whether the energy information or amplitude information of the current sub-frame is greater than a first preset multiple of the energy information or amplitude information of a previous sub-frame, where the first preset multiple is greater than 1. If yes, the procedure proceeds to step 206; and if not, the procedure proceeds to step 204.

That is, whether $E(j)>\delta^*E(j-1)$ is judged, where E(j) is the energy information or amplitude information of the current sub-frame, E(j-1) is the energy information or amplitude information of the previous sub-frame, and δ is a preset value greater than 1.

The current sub-frame may be any one of all the sub-frames of the current frame.

Step 204: Determine a high frequency signal of the current frame as a non-transient signal.

Step 205: Quantize and encode frequency information and signal type information of the high frequency signal of the current frame. The procedure ends.

Step 206: Calculate energy information or amplitude information of sub-frames included in the first half frame of a next frame.

Step 207: Find the minimum energy information or amplitude information in the following information: the energy information or amplitude information of all the sub-frames that are behind a sub-frame of the current frame, where the sub-frame has the maximum energy information or amplitude information in the current frame, and the energy information or amplitude information of the sub-frames included in the first half frame of the next frame.

Step 208: Judge whether the energy information or amplitude information of the sub-frame having the maximum energy information or amplitude information is greater than or equal to a second preset multiple of the found minimum energy information or amplitude information, where the second preset multiple is greater than 1. If yes, the procedure proceeds to step 209; and if not, the procedure proceeds to step 204.

That is, when $E(j)>\delta^*E(j-1)$, whether the energy information or amplitude information of the sub-frame having the maximum energy information or amplitude information is greater than or equal to the second preset multiple of the found minimum energy information or amplitude information is judged, where the second preset multiple is greater than 1. That is, whether $E_{max} \geq \epsilon^* E_{LH}$ is judged, where is a preset value greater than 1. Therefore, only when $E(j)>\delta^*E(j-1)$ and $E_{max} \geq \epsilon^* E_{LH}$, the high frequency signal of the current frame is determined as a transient signal.

In another embodiment of the present invention, in step 208, whether the spectral tilt of the current frame is smaller than or equal to a first threshold value may be judged. If yes, the procedure proceeds to step 209, and at the moment, step 206 and step 207 may not be executed; and if not, the procedure proceeds to step 204.

Step 209: Determine the high frequency signal of the current frame as a transient signal.

Step 210: Quantize and encode time envelopes, the frequency information, and the signal type information of the high frequency signal of the current frame.

In view of the above, in this embodiment, the high frequency signal of the current frame is determined as a transient signal only when the energy information or amplitude information of the current sub-frame is greater than the first preset multiple of the energy information or amplitude information of the previous sub-frame, and the energy information or amplitude information of the sub-frame having the maximum energy information or amplitude information is greater than or equal to the second preset multiple of the found minimum energy information or amplitude information, so that the accuracy of the determination of the transient signal is guaranteed.

Figure 3:
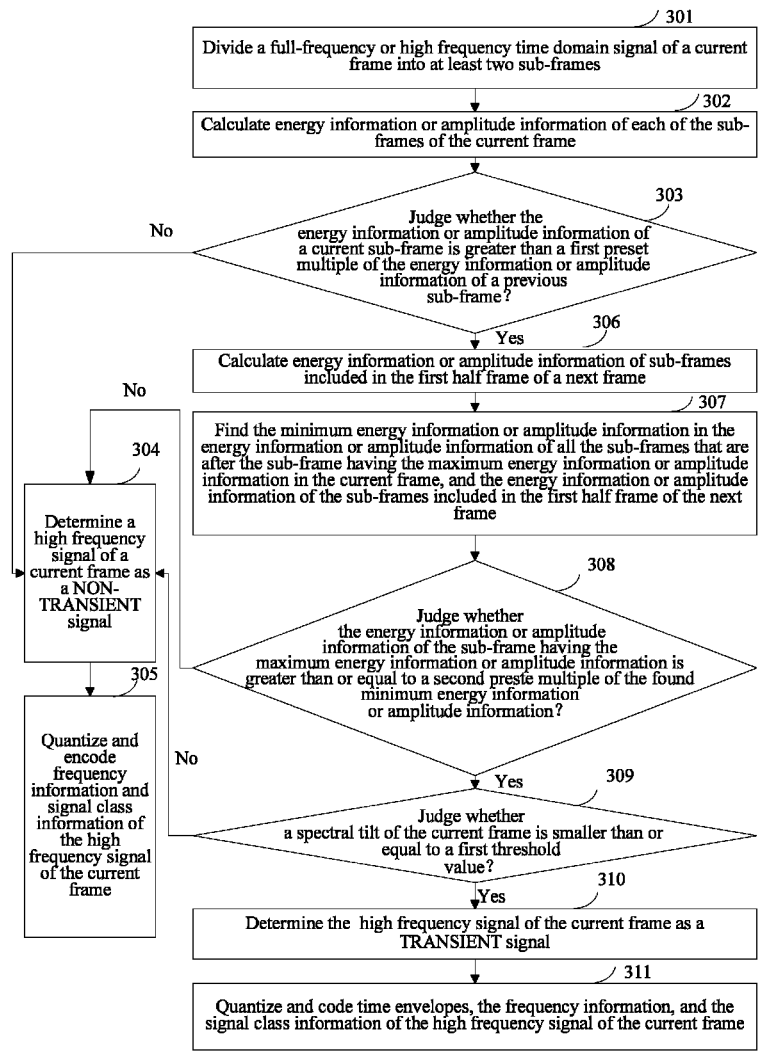
FIG. 3 is a flow chart of a method for decoding a high frequency signal according to an embodiment of the present invention.

FIG. 3 is a flow chart of a method for encoding a high frequency signal according to another embodiment of the present invention, and the embodiment includes the following steps:

Step 301: Divide a full frequency or high frequency time domain signal of a current frame into at least two sub-frames.

Step 302: Calculate energy information or amplitude information of each of the sub-frames of the current frame.

Step 303: Judge whether the energy information or amplitude information of a current sub-frame is greater than a first preset multiple of the energy information or amplitude information of a previous sub-frame, where the first preset multiple is greater than 1. If yes, the procedure proceeds to step 306; and if not, the procedure proceeds to step 304.

Step 304: Determine a high frequency signal of the current frame as a non-transient signal.

Step 305: Quantize and encode frequency information and signal type information of the high frequency signal of the current frame. The procedure ends.

Step 306: Calculate energy information or amplitude information of sub-frames included in the first half frame of a next frame.

Step 307: Find the minimum energy information or amplitude information in the following information: the energy information or amplitude information of all the sub-frames that are after a sub-frame, where the sub-frame has the maximum energy information or amplitude information in the current frame, and the energy information or amplitude information of the sub-frames included in the first half frame of the next frame.

Step 308: Judge whether the energy information or amplitude information of the sub-frame having the maximum energy information or amplitude information is greater than or equal to a second preset multiple of the found minimum energy information or amplitude information, where the second preset multiple is greater than 1. If yes, the procedure proceeds to step 309; and if not, the procedure proceeds to step 304.

Step 309: Judge whether the spectral tilt of the current frame is smaller than or equal to a first threshold value. If yes, the procedure proceeds to step 310; and if not, the procedure proceeds to step 304.

When $E(j)>\delta*E(j-1)$ and $E_{max} \geq \epsilon*E_{LH}$, whether the spectral tilt of the current frame is smaller than or equal to the first threshold value is further judged. Only when the spectral tilt of the current frame is smaller than or equal to the first threshold value, $E(j)>\delta*E(j-1)$ and $E_{max} \geq \epsilon*E_{LH}$, the high frequency signal of the current frame is determined as a transient signal. If the spectral tilt of the current frame is greater than the first threshold value, the current frame is a fricative. The first threshold value may be a preset value greater than 1.

In another embodiment of the present invention, the judgment in step 309 may first be performed. When it is judged that the spectral tilt of the current frame is smaller than or equal to the first threshold value, the judgment in step 308 is then performed. Therefore, only when it is judged that the energy information or amplitude information of the sub-frame having the maximum energy information or amplitude information is greater than or equal to the second preset multiple of the minimum energy information or amplitude information, the procedure proceeds to step 310, that is, the high frequency signal of the current frame is determined as a transient signal.

Step 310: Determine the high frequency signal of the current frame as a transient signal.

Step 311: Quantize and code time envelopes, the frequency information, and the signal type information of the high frequency signal of the current frame.

In view of the above, in this embodiment, the high frequency signal of the current frame is determined as a transient signal only when the energy information or amplitude information of the current sub-frame is greater than the first preset multiple of the energy information or amplitude information of the previous sub-frame, the energy information or amplitude information of the sub-frame having the maximum energy information or amplitude information is greater than or equal to the second preset multiple of the found minimum energy information or amplitude information, and the spectral tilt of the current frame is smaller than or equal to the first threshold value, so that the accuracy of the determination of the transient signal is further guaranteed, the transient signals processed by a coder are further decreased, and the encoding efficiency is further increased.

Figure 4:
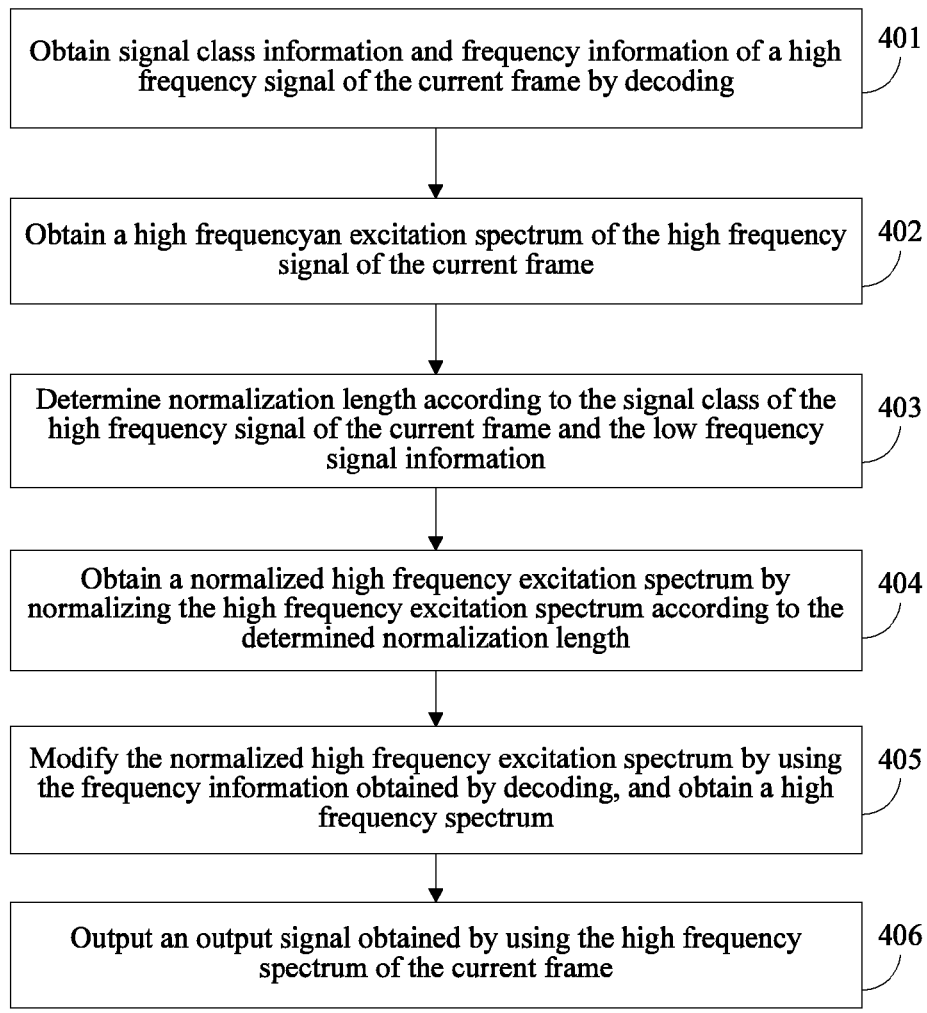
FIG. 4 is a flow chart of a method for decoding a high frequency signal according to another embodiment of the present invention.

Methods for decoding a high frequency signal provided in embodiments of the present invention are further described below. FIG. 4 is a flow chart of a method for decoding a high frequency signal according to an embodiment of the present invention. The embodiment includes the following steps:

Step 401: Obtain signal type information and frequency information of a high frequency signal of the current frame by decoding.

When the high frequency signal of the current frame is a transient signal, and because both frequency envelope information and time envelope information are encoded in encoder, so time envelopes of the high frequency signal of the current frame can also be obtained by decoding.

A low frequency signal can also be obtained by decoding. The decoding of the low frequency signal may be performed by using an existing technique, and is not discussed herein.

Step 402: Obtain a high frequency excitation spectrum of the current frame.

The high frequency excitation spectrum can be predicted from different frequency bands of a low frequency signal according to specific signal type of a high frequency signal, and can also be generated with a random noise.

Step 403: Determine normalization length according to the signal type of the high frequency signal of the current frame and the low frequency signal information.

Specifically, the normalization length of a transient signal and the normalization length of a non-transient signal may be different. The normalization length of specific non-transient signal of the non-transient signal may also be different.

In an embodiment of the present invention, the normalization length can be calculated according to low frequency spectral flatness information and the signal type of the high frequency signal. The low frequency spectral flatness information may be information such as the peak-to-average ratio of each sub-band of low frequency spectral coefficients, or correlation of a low frequency time domain signal, or the zero-crossing rate. In an embodiment of the present invention, the calculation is as follows (in the embodiment, the low frequency spectral flatness information is declared by the peak-to-average ratio of each of the sub-bands of the low frequency spectral coefficients, and the processing is similar when the low frequency spectral flatness information is declared by the correlation of a low frequency time domain signal, or the zero-crossing rate, and is not discussed herein).

The low frequency spectral coefficients are obtained by transforming the decoded low frequency signal.

The low frequency spectral coefficients are divided into M sub-bands, the peak-to-average ratio of each of the sub-bands of the low frequency spectral coefficients is calculated, and the number of the sub-bands which meet the requirement is initialized as n_band=0. The peak-to-average ratio of the sub-band is calculated by using the equation below:

$$\text{sharp}(j) = \frac{(N-1) \times A_{sharp}(j)}{\sum\limits_{k=N*j}^{N*j+N-1} |S_{SHB}(k)| - A_{sharp}(j)}, \text{ where} \quad (11)$$

$$\left(\sum_{k=N*j}^{N*j+N-1} |S_{SHB}(k)|\right) != A_{sharp}(j)$$

N is the number of the spectral coefficient of each of the sub-bands, and j=0, . . . , M−1.

For a current sub-band, if sharp(j)>a1 and $A_{sharp}(j)$>a2, 1 is added to the number n_band of the sub-bands, and a1 and a2 are the preset values.

Then, the normalization length is determined by using the equation below according to the calculated number n_band of the sub-bands and the signal type of the high frequency:

$$\text{length\_norm\_harm} = \left[\alpha * \left(1 - \frac{n\_band}{M}\right)\right], \text{ a harmonic signal} \quad (12)$$

$$\text{length\_norm\_norm} = \left[\beta * \left(1 - \frac{n\_band}{M}\right)\right], \text{ a normal signal },$$

$$\text{length\_norm\_noise} = \left[\gamma * \left(1 - \frac{n\_band}{M}\right)\right], \text{ a noise signal}$$

-continued where $\alpha > \beta > \gamma > 1$

Therefore, in an embodiment of the present invention, the normalization length of the high frequency signal of the current frame whose signal type is harmonic is greater than the normalization length of the high frequency signal of the current frame whose signal type is normal. The normalization length of the high frequency signal of the current frame whose signal type is normal is greater than the normalization length of the high frequency signal of the current frame whose signal type is noise.

In another embodiment of the present invention, a data table of the normalization length of different signal types may be designed ahead. When a high frequency excitation spectrum of a certain type is to be normalized, the required normalization length can be obtained directly from the data table. In an embodiment of the present invention, when the normalization length is designed, the normalization length can be designed so that when frequency envelopes of normal signals are modified, the modification decreases gradually as the frequency band increases.

Step 404: Obtain a normalized high frequency excitation spectrum by normalizing the high frequency excitation spectrum according to the determined normalization length.

Step 405: Modify the normalized high frequency excitation spectrum by using the frequency information obtained by decoding, and obtain a high frequency spectrum.

In another embodiment of the present invention, in order that the high frequency signal obtained by decoding is closer to the original high frequency signal, the following processing is further performed after the high frequency spectrum is obtained.

The high frequency spectrum is smoothed between the current frame and neighboring frames.

A weighting factor used during the smoothing is determined by global energy information or amplitude information of the high frequency signal of the current frame and global energy information or amplitude information of a previous frame. When the current frame is smoothed, a sum of a weighting factor of the high frequency spectrum of the current frame and a weighting factor of a high frequency spectrum of a previous frame or a high frequency spectrum of a next frame is 1.

For example, in an embodiment of the present invention, when the smoothing is performed between the current frame and the previous frame of the current frame, the weighting factor of the previous frame is determined according to the following equation:

$$\begin{aligned} \text{weight} &= \varepsilon * \frac{E_{pre}}{E_{cur}}, & E_{pre} &< \alpha * E_{cur} \\ \text{weight} &= \varepsilon * \frac{E_{cur}}{E_{pre}}, & E_{pre} &> \beta * E_{cur} \\ \text{weight} &= \varepsilon, & \text{else} & \end{aligned} \quad (13)$$

where, $E_{pre}$ is the global energy information or amplitude information of the previous frame, $E_{cur}$ is the global energy information or amplitude information of the high frequency signal of the current frame, $0<\alpha<1$, $\beta>1$, and $0<\varepsilon<1$.

The equation for the smoothing between the current frame and a neighboring frame may be:

$$F[i]=\text{weight}*\text{prev\_}F[i]+(1-\text{weight})*F[i]; \quad (14)$$

where, F[i] is a frequency parameter of the current frame, which may be a frequency envelope, and may also be a amplitude of spectral coefficient, and prev_F[i] is a frequency parameter of the previous frame.

In another embodiment of the present invention, intra-frame smoothing may further be performed on the high frequency spectrum of the current frame by using the following equation:

$$\begin{cases} \text{spec}[i \cdot M + j] = \text{spec}[i \cdot M + j] \cdot \hat{f}[i] & \begin{array}{l} i = 0, \\ j = 0 \ldots M/2 - 1 \end{array} \\ \text{spec}[i \cdot M + j] = \text{spec}[i \cdot M + j] \cdot & i = 0 \ldots N - 2, \\ (\hat{f}[i] \cdot (3/2 - j/M) + \hat{f}[i+1] \cdot (j/M - 1/2)) & j = M/2 \ldots M - 1 \\ \text{spec}[i \cdot M + j] = \text{spec}[i \cdot M + j] \cdot & i = 1 \ldots N - 1, \\ (\hat{f}[i-1] \cdot (1/2 - j/M) + \hat{f}[i] \cdot (1/2 + j/M)) & j = 0 \ldots M/2 - 1 \\ \text{spec}[i \cdot M + j] = \text{spec}[i \cdot M + j] \cdot \hat{f}[i] & \begin{array}{l} i = N - 1, \\ j = M/2 \ldots M \end{array} \end{cases} \quad (15)$$

M is the number of elements in the $i^{th}$ sub-band, N is the number of the sub-bands, i is the $i^{th}$ sub-band, j is the $j^{th}$ element in the $i^{th}$ sub-band, and spec[ ] is the normalized high frequency excitation spectrum.

Step 406: Output an output signal obtained by using the high frequency spectrum of the current frame.

In an embodiment of the present invention, the outputting the output signal obtained by using the high frequency spectrum of the current frame includes: performing inverse transforming on the high frequency spectrum, obtaining a high frequency time domain signal, and outputting the high frequency time domain signal. If the high frequency spectrum is smoothed between the current frame and a neighboring frame and/or in the current frame, the inverse transforming is performed on the high frequency spectrum that is smoothed between the current frame and a neighboring frame and/or in the current frame.

In another embodiment of the present invention, the outputting the output signal obtained by using the high frequency spectrum of the current frame includes: obtaining a full frequency spectrum by combining the high frequency spectrum and a low frequency spectrum together, performing inverse transforming on the full frequency spectrum, obtaining a full frequency time domain signal, and further outputting the full frequency time domain signal.

In view of the above, in this embodiment, when the high frequency excitation spectrum of the high frequency signal is normalized, different normalization lengths may be chosen according to the different types of the non-transient signal, so that the restored high frequency excitation spectrum is closer to that of the original high frequency signal, and the performance of the output signal is improved. Furthermore, in another embodiment of the present invention, when the high frequency spectrum is smoothed between the current frame and a neighboring frame, the weighting factor used during the smoothing between the current frame and a neighboring frame can be determined according to the global energy information or amplitude information of the high frequency signal of the current frame and the global energy information or amplitude information of the previous frame, so that the inter-frame continuity of the restored spectrum of the high frequency signal is better, no post-echo is incurred, and the performance of the output signal is further improved.

Figure 5:
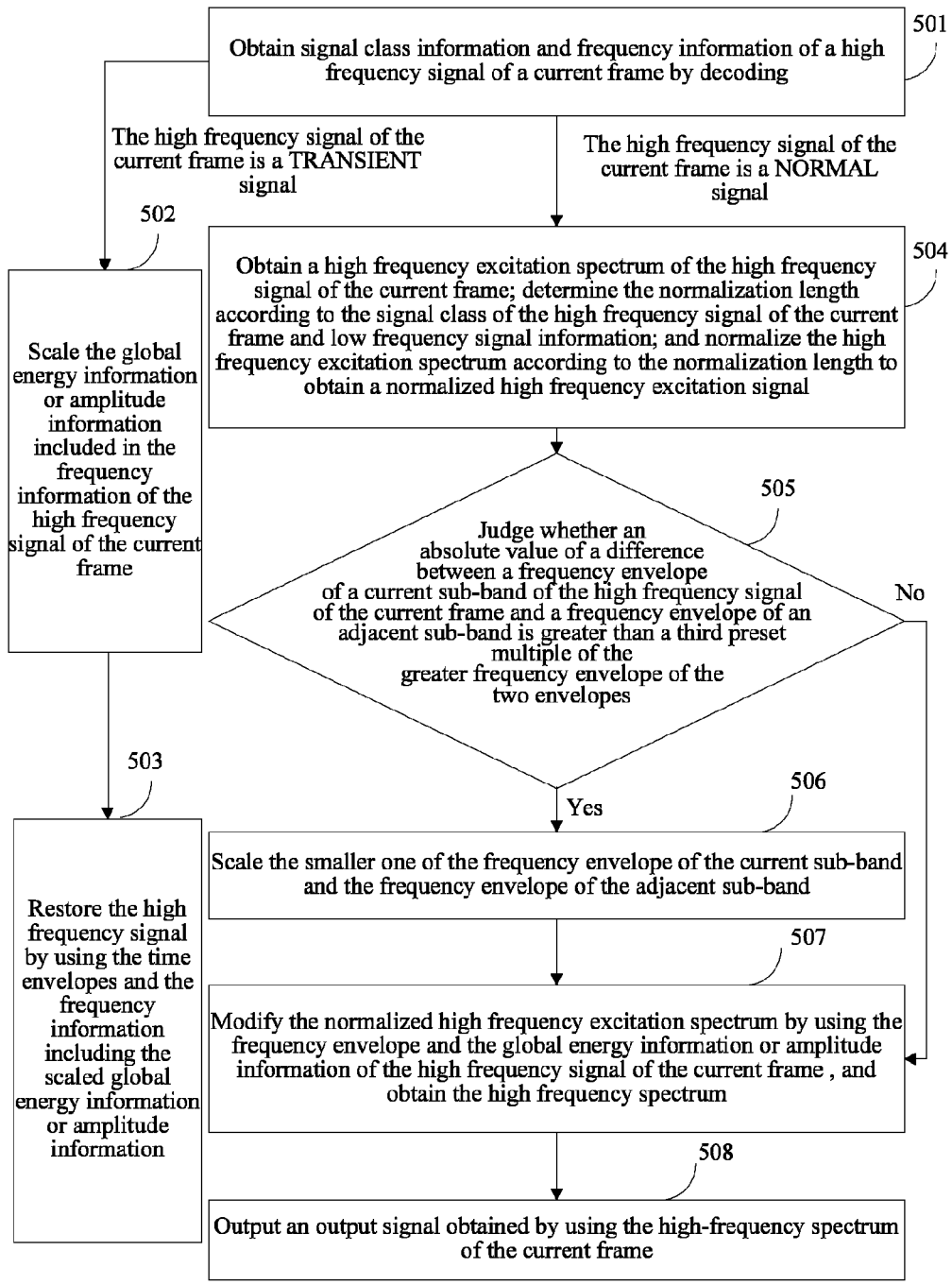
FIG. 5 is a flow chart of a method for decoding a high frequency signal according to an embodiment of the present invention.

FIG. 5 is a flow chart of a method for decoding a high frequency signal according to an embodiment of the present invention, and the embodiment includes the following steps.

Step 501: Obtain signal type information and frequency information of a high frequency signal of a current frame by decoding. When the high frequency signal of the current frame is a transient signal, time envelopes can also be obtained by decoding. The frequency information may include frequency envelopes, or global energy information, or amplitude information, or the frequency envelopes and the global energy information, or the frequency envelopes and the global amplitude information of the high frequency signal of the current frame. If the high frequency signal of the current frame obtained by decoding is a transient signal, the procedure proceeds to step 502; if the high frequency signal of the current frame obtained by decoding is a normal signal, the procedure proceeds to step 504.

Step 502: Scale the global energy information or amplitude information included in the frequency information of the high frequency signal of the current frame.

In another embodiment of the present invention, the frequency envelopes included in the frequency information of the high frequency signal of the current frame may be scaled.

In another embodiment of the present invention, both the frequency envelopes and the global energy information or amplitude information included in the frequency information of the high frequency signal of the current frame may be scaled.

Step 503: Restore the high frequency signal by using the time envelopes and the frequency information including the scaled global energy information or amplitude information. The procedure ends.

In another embodiment of the present invention, the restoration of the high frequency signal may include the following steps. A high frequency excitation spectrum is predicted from a low frequency spectrum, and the predicted high frequency excitation spectrum is normalized. Normalization length may be the same as the normalization length of the noise signal in step 403. The normalized high frequency excitation spectrum is modified by using the frequency envelopes $\hat{f}_{rms}(j)$ obtained by decoding and the scaled global energy information or amplitude information $\hat{g}_{rms}(j)$, and a high frequency spectrum is obtained. The high frequency spectrum is inverse transformed to a high frequency time domain signal, and a high frequency time domain signal is obtained. Then, the high frequency time domain signal is further modified by using the time envelopes $\hat{t}_{rms}(j)$ obtained by decoding.

Step 504: Obtain a high frequency excitation spectrum of the high frequency signal of the current frame. The normalization length is determined according to the signal type of the high frequency signal of the current frame and low frequency signal information. The high frequency excitation spectrum is normalized according to the normalization length to obtain a normalized high frequency excitation spectrum.

Step 505: Judge whether the absolute value of the difference between a frequency envelope of a current sub-band of the high frequency signal of the current frame and a frequency envelope of an adjacent sub-band is greater than a third preset multiple of the greater frequency envelope of the two envelopes. The third preset multiple is greater than 0 and smaller than 1. If yes, the procedure proceeds to step 506; and if not, the procedure proceeds to step 507.

Step 506: Scale the smaller one of the frequency envelope of the current sub-band and the frequency envelope of the adjacent sub-band.

In another embodiment of the present invention, frequency envelopes $\hat{f}_{rms}(j)$ of a normal signal of a non-transient signal may be processed as follows. When the absolute value of the difference between two adjacent frequency envelopes is greater than times of the greater frequency envelope, the smaller frequency envelope is decreased to a times of the smaller frequency envelope, so that the smaller frequency envelope gets smaller, where $0<\alpha<1$ and $0<\epsilon<1$. Specifically, it can be represented by the following equations:

$$\hat{f}_{rms}(j+1)=\alpha*\hat{f}_{rms}(j+1), \hat{f}_{rms}(j)>\hat{f}_{rms}(j+1) \text{ and}(\hat{f}_{rms}(j)-\hat{f}_{rms}(j+1))>\epsilon*\hat{f}_{rms}(j) \quad (16)$$

$$\hat{f}_{rms}(j)=\alpha*\hat{f}_{rms}(j), \hat{f}_{rms}(j+1)>\hat{f}_{rms}(j) \text{ and}(\hat{f}_{rms}(j+1)-\hat{f}_{rms}(j))>\epsilon*\hat{f}_{rms}(j+1) \quad (17)$$

where $0<\alpha<1$ and $0<\epsilon<1$.

Step 507: Modify the normalized high frequency excitation spectrum by using the frequency envelope and the global energy information or amplitude information of the high frequency signal of the current frame, and obtain the high frequency spectrum.

If the absolute value of the difference between the frequency envelope of the current sub-band of the high frequency signal of the current frame and the frequency envelope of the adjacent sub-band is greater than the third preset multiple of the greater frequency envelope of the two envelopes, the frequency envelope to be used is the frequency envelope of the high frequency signal of the current frame including the scaled smaller frequency envelope of the frequency envelope of the current sub-band and the frequency envelope of the adjacent sub-band; otherwise, the frequency envelope not scaled is used.

Step 508: Output an output signal obtained by using the current frame high frequency spectrum.

In view of the above, in this embodiment, when the current frame is a transient signal, the global energy information or amplitude information of the high frequency signal of the current frame may be scaled before further processing, so that a pre-echo or a post-echo of the transient signal is reduced, and the performance of the transient signal can be further improved. Furthermore, when the absolute value of the difference between the frequency envelope of a normal signal and the frequency envelope of a high frequency signal of the previous frame or the frequency envelope of a high frequency signal of a next frame is greater than the third preset multiple of the frequency envelope of the high frequency signal of the previous frame or the high frequency signal of the next frame, the smaller frequency envelope of the normal signal may further be decreased, so that the noise of the restored high frequency signal of the normal signal is reduced, and the performance of the non-transient signal can further be improved.

It should be noted that, for the sake of easy description, the above methods are described as the combination of a series of actions, but it should be understood by persons skilled in the art that the present invention is not limited by the sequence of the described action, because according to the present invention, some steps can be performed in other sequences or at the same time. Furthermore, it should also be understood by persons skilled in the art that, all the embodiments described in the specification are preferred embodiments, and the involved action or modules are not necessarily required in the present invention.

Figure 6:
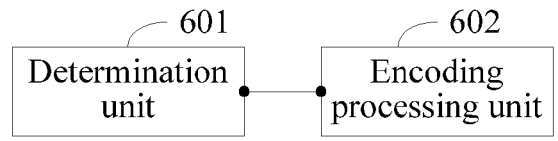
FIG. 6 is a simplified block diagram of a device for encoding a high frequency signal according to another embodiment of the present invention.

Devices for encoding a high frequency signal provided in embodiments of the present invention are described below. FIG. 6 is simplified block diagram of a device for encoding a high frequency signal according to an embodiment of the present invention. The embodiment includes a determination unit 601 and an encoding processing unit 602.

The determination unit 601 is configured to determine a signal type of a high frequency signal of a current frame.

The encoding processing unit 602 is configured to smooth and scale time envelopes of the high frequency signal of the current frame, and obtain time envelopes of the high frequency signal of the current frame that require to be encoded, when the determination unit 601 determines that the high frequency signal of the current frame is a non-transient signal, but a high frequency signal of the previous frame is a transient signal; and quantize and encode the time envelopes of the high frequency signal of the current frame that require to be encoded, and frequency information and signal type information of the high frequency signal of the current frame. Signal type information of a transient signal is used when the signal type information of the high frequency signal of the current frame is quantized and encoded.

In another embodiment of the present invention, the encoding processing unit 602 may also be configured to quantize and encode the time envelopes, the frequency information, and the signal type information of the high frequency signal of the current frame when the determination unit 601 determines that the high frequency signal of the current frame is a transient signal.

In another embodiment of the present invention, the encoding processing unit 602 may also be configured to quantize and encode the frequency information and the signal type information of the high frequency signal of the current frame when the determination unit 601 determines that the high frequency signal of the current frame is a non-transient signal, but the high frequency signal of the previous frame is also a non-transient signal.

In another embodiment of the present invention, the encoding processing unit 602 may also be configured to form the time envelopes of the high frequency signal of the current frame that require to be encoded with time envelopes of the second half frame of the previous-frame high frequency signal and the smoothed and scaled time envelopes of the first half frame of the current-frame high frequency signal after the time envelopes of the high frequency signal of the current frame are smoothed and scaled.

In another embodiment of the present invention, the frequency information includes global energy information or amplitude information of the high frequency signal of the current frame. At the moment, the encoding processing unit 602 is also configured to scale the global energy information or amplitude information of the high frequency signal of the current frame when the determination unit 601 determines that the high frequency signal of the current frame is a transient signal, and quantize and encode the scaled global energy information or amplitude information of the high frequency signal of the current frame.

In view of the above, in this embodiment, when the high frequency signal of the current frame is a non-transient signal, and the previous frame of the non-transient signal is a transient signal, the current frame is processed as a transient signal, and the time envelopes of the current frame that require to be encoded can be formed by the time envelopes of the second half frame of the previous frame and the time envelopes of the first half frame of the current frame. Therefore, the time envelopes of the current frame are closer to a transient signal, and the performance of the transient signal is improved. In another embodiment of the present invention, when the current frame is a transient signal, the global energy information or amplitude information of the high frequency signal of the current frame can be scaled, so that a pre-echo or a post-echo of the transient signal is reduced, and the performance of the transient signal is further improved.

Figure 7:
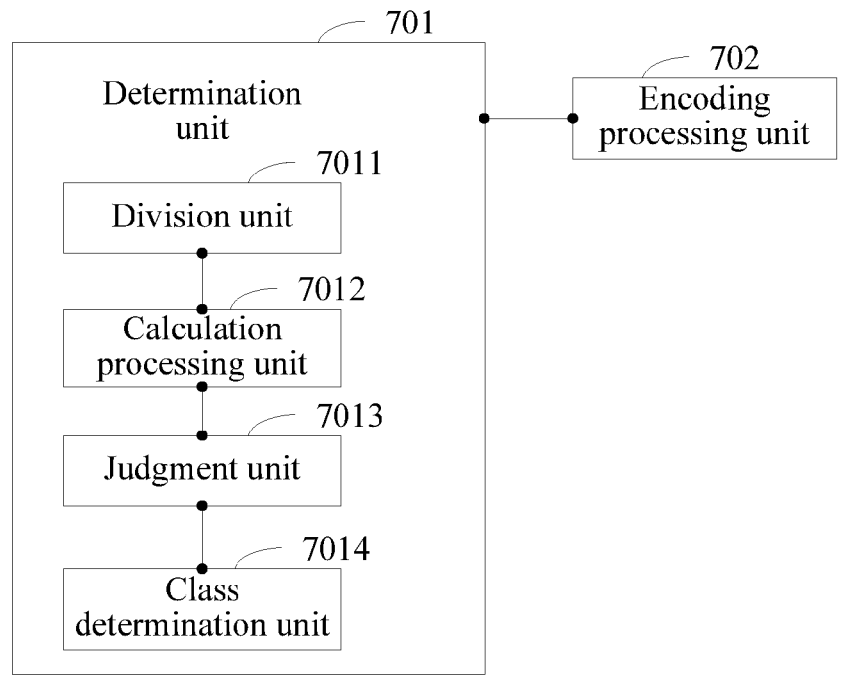
FIG. 7 is a simplified block diagram of a device for encoding a high frequency signal according to another embodiment of the present invention.

FIG. 7 is a simplified block diagram of a device for encoding a high frequency signal according to another embodiment of the present invention, and the embodiment includes a determination unit 701 and an encoding processing unit 702.

The determination unit 701 is configured to determine a signal type of a high frequency signal of a current frame.

As shown in FIG. 7, the determination unit 701 may include a division unit 7011, a calculation processing unit 7012, a judgment unit 7013, and a type determination unit 7014. The division unit 7011 is configured to divide a full frequency or high frequency time domain signal of the current frame into at least two sub-frames. The calculation processing unit 7012 is configured to calculate energy information or amplitude information of each of the sub-frames obtained by the division unit 7011. The judgment unit 7013 is configured to judge whether the energy information or amplitude information of a current sub-frame calculated by the calculation processing unit 7012 is greater than a first preset multiple of the energy information or amplitude information of a previous sub-frame. The first preset multiple is greater than 1. The type determination unit 7014 is configured to determine the high frequency signal of the current frame as a transient signal when the judgment unit 7013 judges that the energy information or amplitude information of the current sub-frame is greater than the first preset multiple of the energy information or amplitude information of the previous sub-frame; and determine the high frequency signal of the current frame as a non-transient signal when the judgment unit 7013 judges that the energy information or amplitude information of any sub-frames of the current-frame high frequency signal is smaller than or equal to the first preset multiple of the energy information or amplitude information of the previous sub-frame of the sub-frame.

In another embodiment of the present invention, the calculation processing unit 7012 may also be configured to calculate energy information or amplitude information of sub-frames included in the first half frame of a next frame when it is judged that the energy information or amplitude information of the current sub-frame is greater than the first preset multiple of the energy information or amplitude information of the previous sub-frame and the energy information or amplitude information of the current sub-frame is the maximum energy information or amplitude information of all the sub-frame of the current frame; and find the minimum energy information or amplitude information in the following information: the energy information or amplitude information of all the sub-frames that are behind a sub-frame of the current frame, where the sub-frame has the maximum energy information or amplitude information in the high frequency signal of the current frame, and the energy information or amplitude information of the sub-frames included in the first half frame of the next frame. The judgment unit 7013 is further configured to judge whether the energy information or amplitude information of the sub-frame having the maximum energy information or amplitude information is greater than or equal to a second preset multiple of the minimum energy information or amplitude information found by the calculation processing unit 7012. The second preset multiple is greater than 1. At the moment, the type determination unit 7014 is configured to determine the high frequency signal of the current frame as a transient signal only when the judgment unit 7013 judges that the energy information or amplitude information of the current sub-frame is greater than the first preset multiple of the energy information or amplitude information of the previous sub-frame, and the energy information or amplitude information of the sub-frame having the maximum energy information or amplitude information is greater than or equal to the second preset multiple of the minimum energy information or amplitude information found by the calculation processing unit 7012.

In another embodiment of the present invention, the judgment unit 7013 is further configured to judge whether the spectral tilt of the high frequency signal of the current frame is smaller than or equal to a first threshold value when it is judged that the energy information or amplitude information of the current sub-frame is greater than the first preset multiple of the energy information or amplitude information of the previous sub-frame, and the energy information or amplitude information of the sub-frame having the maximum energy information or amplitude information is greater than or equal to the second preset multiple of the minimum energy information or amplitude information found by the calculation processing unit 7012. At the moment, the type determination unit 7014 is configured to determine the high frequency signal of the current frame as a transient signal only when the judgment unit 7013 judges that the energy information or amplitude information of the current sub-frame is greater than the first preset multiple of the energy information or amplitude information of the previous sub-frame, the energy information or amplitude information of the sub-frame having the maximum energy information or amplitude information is greater than or equal to the second preset multiple of the minimum energy information or amplitude information found by the calculation processing unit 7012, and the spectral tilt of the high frequency signal of the current frame is smaller than or equal to the first threshold value.

In another embodiment of the present invention, the judgment unit 7013 is further configured to judge whether the spectral tilt of the high frequency signal of the current frame is smaller than or equal to the first threshold value when it is judged that the energy information or amplitude information of the current sub-frame is greater than the first preset multiple of the energy information or amplitude information of the previous sub-frame. At the moment, the type determination unit 7014 is configured to determine the high frequency signal of the current frame as a transient signal only when the judgment unit 7013 judges that the energy information or amplitude information of the current sub-frame is greater than the first preset multiple of the energy information or amplitude information of the previous sub-frame, and the spectral tilt of the high frequency signal of the current frame is smaller than or equal to the first threshold value.

In another embodiment of the present invention, the determination unit 701 may further be configured to determine the high frequency signal of the current frame as a harmonic signal, or a noise signal, or a normal signal when the high frequency signal of the current frame is determined as a non-transient signal.

The encoding processing unit 702 is configured to quantize and encode time envelopes, frequency information, and signal type information of the high frequency signal of the current frame when the determination unit 701 determines that the high frequency signal of the current frame is a transient signal.

When the determination unit 701 determines that the high frequency signal of the current frame is a non-transient signal, but the high frequency signal of the previous frame is a transient signal, the encoding processing unit 702 is configured to smooth and scale the time envelopes of the high frequency signal of the current frame, and obtain time envelopes of the high frequency signal of the current frame that require to be encoded; and quantize and encode the time envelopes of the high frequency signal of the current frame that require to be encoded, and the frequency information and the signal type information of the high frequency signal of the current frame. Signal type information of a transient signal is used when the signal type information of the high frequency signal of the current frame is quantized and encoded.

When the determination unit 701 determines that the high frequency signal of the current frame is a non-transient signal, but the high frequency signal of the previous frame is also a non-transient signal, the encoding processing unit 702 is configured to quantize and encode the frequency information and the signal type information of the high frequency signal of the current frame.

In another embodiment of the present invention, the encoding processing unit 702 may further be configured to form the time envelopes of the high frequency signal of the current frame that require to be encoded with time envelopes of the second half frame of the previous-frame high frequency signal and the smoothed and scaled time envelopes of the first half frame of the current-frame high frequency signal after the time envelopes of the high frequency signal of the current frame are smoothed and scaled.

In view of the above, in this embodiment, when the high frequency signal of the current frame is a non-transient signal, and the previous frame of the non-transient signal is a transient signal, the current frame is processed as a transient signal, so that the performance of the transient signal is improved. Furthermore, in another embodiment of the present invention, the time envelopes of the current frame that require to be encoded may be formed by the time envelopes of the second half frame of the previous frame and the time envelopes of the first half frame of the current frame, so that the time envelop of the current frame is closer to a transient signal, and the performance of the transient signal is further improved. Furthermore, in another embodiment of the present invention, the high frequency signal of the current frame is determined as a transient signal only when the energy information or amplitude information of the current sub-frame is greater than the first preset multiple of the energy information or amplitude information of the previous sub-frame, and the energy information or amplitude information of the sub-frame having the maximum energy information or amplitude information is greater than or equal to the second preset multiple of the found minimum energy information or amplitude information, so that the accuracy of the determination of the transient signal is guaranteed, the number of transient signals processed by an encoder is reduced, and the encoding efficiency is increased. In another embodiment of the present invention, the high frequency signal of the current frame is determined as a transient signal only when the energy information or amplitude information of the current sub-frame is greater than the first preset multiple of the energy information or amplitude information of the previous sub-frame, the energy information or amplitude information of the sub-frame having the maximum energy information or amplitude information is greater than or equal to the second preset multiple of the found minimum energy information or amplitude information, and the spectral tilt of the high frequency signal of the current frame is smaller than or equal to the first threshold value, so that the accuracy of the determination of the transient signal is further guaranteed, the transient signals processed by an encoder are further decreased, and the encoding efficiency is further increased.

Figure 8:
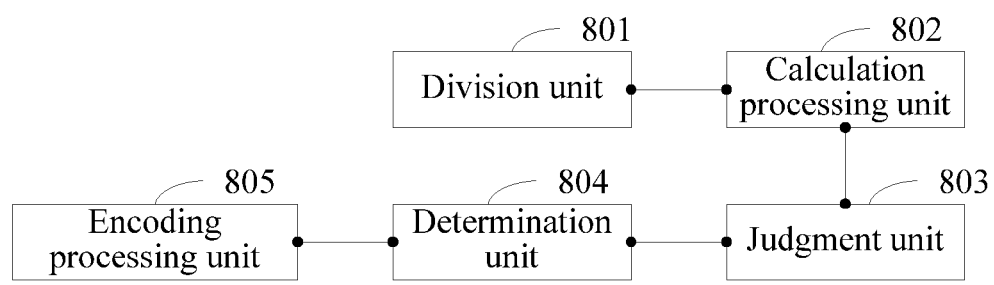
FIG. 8 is a simplified block diagram of a device for encoding a high frequency signal according to another embodiment of the present invention.

FIG. 8 is a simplified block diagram of a device for encoding a high frequency signal according to another embodiment of the present invention, and the embodiment includes a division unit 801, a calculation processing unit 802, a judgment unit 803, a determination unit 804, and an encoding processing unit 805.

The division unit 801 is configured to divide a full frequency or high frequency time domain signal of a current frame into at least two sub-frames.

The calculation processing unit 802 is configured to calculate energy information or amplitude information of each of the sub-frames of the current frame divided by the division unit 801. When the judgment unit 803 judges that the energy information or amplitude information of a current sub-frame is greater than a first preset multiple of the energy information or amplitude information of a previous sub-frame, the calculation processing unit 802 is configured to calculate energy information or amplitude information of sub-frames included in the first half frame of a next frame; and find the minimum energy information or amplitude information in the following information: the energy information or amplitude information of all the sub-frames that are behind a sub-frame of the current frame, where the sub-frame has the maximum energy information or amplitude information in the current frame, and the energy information or amplitude information of the sub-frames included in the first half frame of the next frame.

The judgment unit 803 is configured to judge whether the energy information or amplitude information of the current sub-frame calculated by the calculation processing unit 802 is greater than the first preset multiple of the energy information or amplitude information of the previous sub-frame; and judge whether the energy information or amplitude information of the sub-frame having the maximum energy information or amplitude information is greater than or equal to a second preset multiple of the minimum energy information or amplitude information found by the calculation processing unit 802. The second preset multiple is greater than 1, and the first preset multiple is greater than 1.

The determination unit 804 is configured to determine the high frequency signal of the current frame as a transient signal when the judgment unit 803 judges that the energy information or amplitude information of the sub-frame having the maximum energy information or amplitude information is greater than or equal to the second preset multiple of the minimum energy information or amplitude information found by the calculation processing unit 802.

The encoding processing unit 805 is configured to quantize and encode time envelopes, frequency information, and signal type information of the high frequency signal of the current frame when the determination unit 804 determines that the high frequency signal of the current frame is a transient signal.

In another embodiment of the present invention, the judgment unit 803 may further be configured to judge whether the spectral tilt of the current frame is smaller than or equal to a first threshold value when it is judged that the energy information or amplitude information of the sub-frame having the maximum energy information or amplitude information is greater than or equal to the second preset multiple of the minimum energy information or amplitude information found by the calculation processing unit 802. At the moment, the determination unit 804 is only configured to determine the high frequency signal of the current frame as a transient signal only when the judgment unit 803 judges that the spectral tilt of the current frame is smaller than or equal to the first threshold value.

In view of the above, in this embodiment, the high frequency signal of the current frame is determined as a transient signal only when the energy information or amplitude information of the current sub-frame is greater than the first preset multiple of the energy information or amplitude information of the previous sub-frame, and the energy information or amplitude information of the sub-frame having the maximum energy information or amplitude information is greater than or equal to the second preset multiple of the found minimum energy information or amplitude information, so that the accuracy of the determination of the transient signal is guaranteed, the number of transient signals processed by an encoder is reduced, and the encoding efficiency is increased. Furthermore, in another embodiment of the present invention, the high frequency signal of the current frame is determined as a transient signal only when the energy information or amplitude information of the current sub-frame is greater than the first preset multiple of the energy information or amplitude information of the previous sub-frame, the energy information or amplitude information of the sub-frame having the maximum energy information or amplitude information is greater than or equal to the second preset multiple of the found minimum energy information or amplitude information, and the spectral tilt of the current frame is smaller than or equal to the first threshold value, so that the accuracy of the determination of the transient signal is further guaranteed, the number of transient signals processed by an encoder is further decreased, and the encoding efficiency is further increased.

Figure 9:
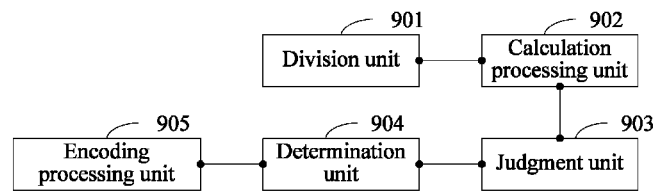
FIG. 9 is a simplified block diagram of a device for encoding a high frequency signal according to another embodiment of the present invention.

FIG. 9 is a simplified block diagram of a device for encoding a high frequency signal according to another embodiment of the present invention, and the embodiment includes a division unit 901, a calculation processing unit 902, a judgment unit 903, a determination unit 904, and an encoding processing unit 905.

The division unit 901 is configured to divide a full frequency or high frequency time domain signal of a current frame into at least two sub-frames.

The calculation processing unit 902 is configured to calculate energy information or amplitude information of each of sub-frames of the current frame divided by the division unit 901.

The judgment unit 903 is configured to judge whether the energy information or amplitude information of the current sub-frame calculated by the calculation processing unit 902 is greater than a first preset multiple of energy information or amplitude information of a previous sub-frame; and judge whether the spectral tilt of the current frame is smaller than or equal to a first threshold value if the energy information or amplitude information of the current sub-frame is greater than the first preset multiple of the energy information or amplitude information of the previous sub-frame. The first preset multiple is greater than 1.

The determination unit 904 is configured to determine the high frequency signal of the current frame as a transient signal when the judgment unit 903 judges that the spectral tilt of the current frame is smaller than or equal to the first threshold value.

The encoding processing unit 905 is configured to quantize and encode time envelopes, frequency information, and signal type information of the high frequency signal of the current frame when the determination unit 904 determines that the high frequency signal of the current frame is a transient signal.

In another embodiment of the present invention, the calculation processing unit 902 is further configured to calculate energy information or amplitude information of sub-frames included in the first half frame of a next frame when the judgment unit 903 judges that the spectral tilt of the current frame is smaller than or equal to the first threshold value; and find the minimum energy information or amplitude information in the following information: the energy information or amplitude information of all sub-frames that are behind a sub-frame of the current frame, where the sub-frame has the maximum energy information or amplitude information in the current frame, and the energy information or amplitude information of the sub-frames included in the first half frame of frame the next frame. The judgment unit 903 may further be configured to further judge whether the energy information or amplitude information of the sub-frame having the maximum energy information or amplitude information is greater than or equal to a second preset multiple of the minimum energy information or amplitude information found by the calculation processing unit 902 when it is judged that the spectral tilt of the current frame is smaller than or equal to the first threshold value. At the moment, the determination unit 904 is only configured to determine the high frequency signal of the current frame as a transient signal only when the judgment unit 903 judges that the energy information or amplitude information of the sub-frame having the maximum energy information or amplitude information is greater than or equal to the second preset multiple of the minimum energy information or amplitude information found by the calculation processing unit 902.

In view of the above, in this embodiment, the high frequency signal of the current frame is determined as a transient signal only when the energy information or amplitude information of the current sub-frame is greater than the first preset multiple of the energy information or amplitude information of the previous sub-frame, and the spectral tilt of the current frame is smaller than or equal to the first threshold value, so that the accuracy of the determination of the transient signal is guaranteed, the number of transient signals processed by an encoder is decreased, and the encoding efficiency is increased. Furthermore, in another embodiment of the present invention, the high frequency signal of the current frame is determined as a transient signal only when the energy information or amplitude information of the current sub-frame is greater than the first preset multiple of the energy information or amplitude information of the previous sub-frame, the energy information or amplitude information of the sub-frame having the maximum energy information or amplitude information is greater than or equal to the second preset multiple of the found minimum energy information or amplitude information, and the spectral tilt of the current frame is smaller than or equal to the first threshold value, so that the accuracy of the determination of the transient signal is further guaranteed, the transient signals processed by an encoder are further decreased, and the encoding efficiency is further increased.

Figure 10:
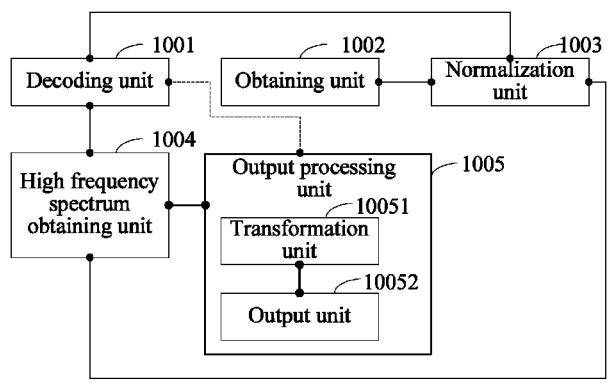
FIG. 10 is a simplified block diagram of a device for decoding a high frequency signal according to an embodiment of the present invention.

Devices for decoding a high frequency signal provided in embodiments of the present invention are described below. FIG. 10 is simplified block diagram of a device for decoding a high frequency signal according to an embodiment of the present invention. The embodiment includes a decoding unit 1001, an obtaining unit 1002, a normalization unit 1003, a high frequency spectrum obtaining unit 1004, and an output processing unit 1005.

The decoding unit 1001 is configured to obtain signal type information and frequency information of a high frequency signal of a current frame by decoding.

The obtaining unit 1002 is configured to obtain a high frequency excitation spectrum of the current frame.

The normalization unit 1003 is configured to determine normalization length according to the signal type of the high frequency signal of the current frame obtained by the decoding unit 1001 and low frequency signal information, and obtain a normalized high frequency excitation spectrum by normalizing the high frequency excitation spectrum obtained by the obtaining unit 1002 according to the normalization length.

The high frequency spectrum obtaining unit 1004 is configured to modify the normalized high frequency excitation spectrum obtained by the normalization unit 1003 by using the frequency information obtained by the decoding unit 1001, and obtain a high frequency spectrum.

The output processing unit 1005 is configured to obtain an output signal obtained by using the high frequency spectrum of the current frame obtained by the high frequency spectrum obtaining unit 1004, and output the output signal.

As shown in FIG. 10, in another embodiment of the present invention, the output processing unit 1005 includes: a transformation unit 10051, configured to perform inverse transforming on the high frequency spectrum obtained by the high frequency spectrum obtaining unit 1004, and obtain a high frequency time domain signal; and an output unit 10052, configured to output the high frequency time domain signal obtained by the transformation unit 10051.

In another embodiment of the present invention, the decoding unit 1001 is further configured to obtain time envelopes of the high frequency signal of the current frame by decoding when the high frequency signal of the current frame is a transient signal. At the moment, the transformation unit 10051 may further be configured to modify the high frequency time domain signal obtained by performing frequency-time transformation by using the time envelopes of the high frequency signal of the current frame obtained by the decoding unit 1001. The output unit 10052 is configured to output the high frequency time domain signal modified by using the time envelopes of the high frequency signal of the current frame.

In view of the above, in this embodiment, when the high frequency excitation spectrum of the high frequency signal is normalized, different normalization lengths may be chosen according to different types of non-transient signals, so that the high frequency excitation spectrum of the restored high frequency signal is closer to the original high frequency signal, and the performance of the output signal is improved.

Figure 11:
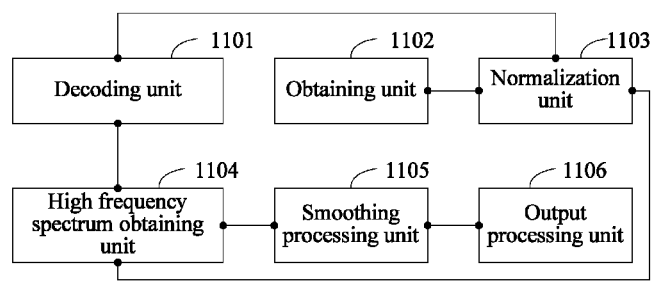
FIG. 11 is a simplified block diagram of a device for decoding a high frequency signal according to another embodiment of the present invention.

FIG. 11 is a simplified block diagram of a device for decoding a high frequency signal according to another embodiment of the present invention, and the embodiment includes a decoding unit 1101, an obtaining unit 1102, a normalization unit 1103, a high frequency spectrum obtaining unit 1104, a smoothing processing unit 1105, and an output processing unit 1106.

The decoding unit 1101 is configured to obtain signal type information and frequency information of a high frequency signal of a current frame by decoding.

The obtaining unit 1102 is configured to obtain a high frequency excitation spectrum the current frame.

The normalization unit 1103 is configured to determine normalization length according to the signal type of the high frequency signal of the current frame obtained by the decoding unit 1101 and low frequency signal information, and obtain a normalized high frequency excitation spectrum by normalizing the high frequency excitation spectrum obtained by the obtaining unit 1102 according to the normalization length.

The high frequency spectrum obtaining unit 1104 is configured to modify the normalized high frequency excitation spectrum obtained by the normalization unit 1103 by using the frequency information obtained by the decoding unit 1101, and obtain a high frequency spectrum.

The smoothing processing unit 1105 is configured to smooth the high frequency spectrum between the current frame and a neighboring frame, where the spectrum is obtained by the high frequency spectrum obtaining unit 1104. A weighting factor used during the smoothing is determined by global energy information or amplitude information of the high frequency signal of the current frame and global energy information or amplitude information of a previous frame, and the sum of a weighting factor of the high frequency spectrum of the current frame and a weighting factor of a high frequency spectrum of a previous frame or a high frequency spectrum of a next frame is 1.

In another embodiment of the present invention, the smoothing processing unit 1105 may further perform the intra-frame smoothing on the high frequency spectrum in the current frame, where the spectrum is obtained by the high frequency spectrum obtaining unit 1104.

The output processing unit 1106 is configured to obtain an output signal by using the high frequency spectrum of the current frame obtained by the smoothing processing unit 1105, and output the output signal.

In view of the above, in this embodiment, when the high frequency spectrum is smoothed between the current frame and a neighboring frame, the weighting factor used during the smoothing can be determined according to the global energy information or amplitude information of the high frequency signal of the current frame and the global energy information or amplitude information of the previous frame, so that the high frequency excitation spectrum of the restored high frequency signal is further closer to the original high frequency signal, and the performance of the output signal is further improved.

Figure 12:
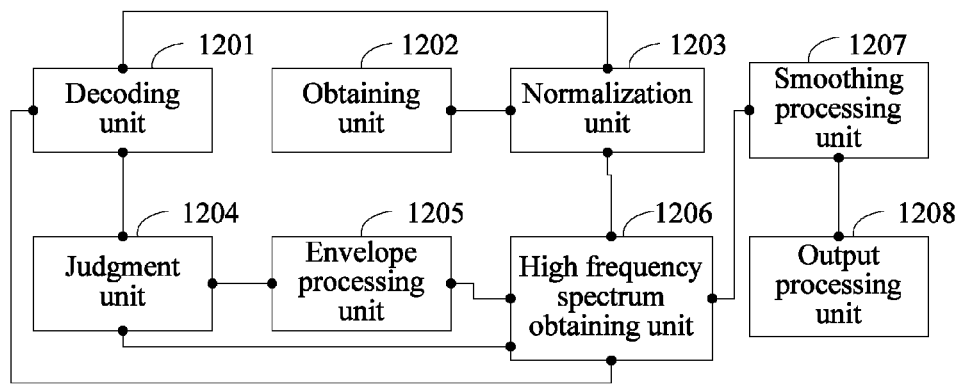
FIG. 12 is a simplified block diagram of a device for decoding a high frequency signal according to another embodiment of the present invention.

FIG. 12 is a simplified block diagram of a device for decoding a high frequency signal according to another embodiment of the present invention, and the embodiment includes a decoding unit 1201, an obtaining unit 1202, a normalization unit 1203, a judgment unit 1204, an envelope processing unit 1205, a high frequency spectrum obtaining unit 1206, a smoothing processing unit 1207, and an output processing unit 1208.

The decoding unit 1201 is configured to obtain signal type information and frequency information of a high frequency signal of a current frame by decoding. The frequency information includes frequency envelopes.

The obtaining unit 1202 is configured to obtain a high frequency excitation spectrum of the high frequency signal of the current frame.

The normalization unit 1203 is configured to determine normalization length according to the signal type of the high frequency signal of the current frame obtained by the decoding unit 1201 and low frequency signal information, and obtain a normalized high frequency excitation spectrum by normalizing the high frequency excitation spectrum obtained by the obtaining unit 1202 according to the normalization length.

The judgment unit 1204 is configured to judge whether the absolute value of the difference between a frequency envelope of a current sub-band of the high frequency signal of the current frame and a frequency envelope of an adjacent sub-band is greater than a third preset multiple of the greater frequency envelope of the two envelopes, when the high frequency signal of the current frame obtained by the decoding unit 1201 is a normal signal. The third preset multiple is greater than 0 and smaller than 1.

The envelope processing unit 1205 is configured to scale the smaller one of the frequency envelope of the current sub-band and the frequency envelope of the adjacent sub-band when the judgment unit 1204 judges that the absolute value of the difference between the frequency envelope of the current sub-band and the frequency envelope of the adjacent sub-band is greater than the third preset multiple of the greater frequency envelope of the two envelopes.

The high frequency spectrum obtaining unit 1206 is configured to modify the normalized high frequency excitation spectrum obtained by the normalization unit 1203 by using the frequency information obtained by the decoding unit 1201, and obtain a high frequency spectrum. The high frequency spectrum obtaining unit 1206 is configured to modify the normalized high frequency excitation spectrum by using the frequency envelopes of the high frequency signal of the current frame after the envelope processing unit 1205 scaled the smaller frequency envelopes when the high frequency signal of the current frame obtained by the decoding unit 1201 is a normal signal, and the judgment unit 1204 judges that absolute value of the difference between the frequency envelope of the current sub-band and the frequency envelope of the adjacent sub-band is greater than the third preset multiple of the greater frequency envelope of the two envelopes.

The smoothing processing unit 1207 is configured to smooth the high frequency spectrum between the current frame and a neighboring frame, where the high frequency spectrum obtained by the high frequency spectrum obtaining unit, wherein a weighting factor used during the smoothing is determined by the global energy information or amplitude information of the high frequency signal of the current frame and global energy information or amplitude information of a previous frame, and the sum of a weighting factor of the high frequency spectrum of the current frame and a weighting factor of a high frequency spectrum of a previous frame or a high frequency spectrum of a next frame is 1.

The output processing unit 1208 is configured to obtain an output signal by using the high frequency spectrum of the current frame obtained by the smoothing processing unit 1207, and output the output signal.

In view of the above, in this embodiment, when the absolute value of the difference between the frequency envelope of a normal signal and the frequency envelope of the high frequency signal of the previous frame or the frequency envelope of the high frequency signal of the next frame is greater than the third preset multiple of the frequency envelope of the high frequency signal of the previous frame or the high frequency signal of the next frame, the smaller frequency envelope of the normal signal can be decreased, so that it is easier to distinguish the frequency envelope of the normal signal from the frequency envelopes of adjacent frames, and the performance of the non-transient signal can further be improved.

Figure 13:
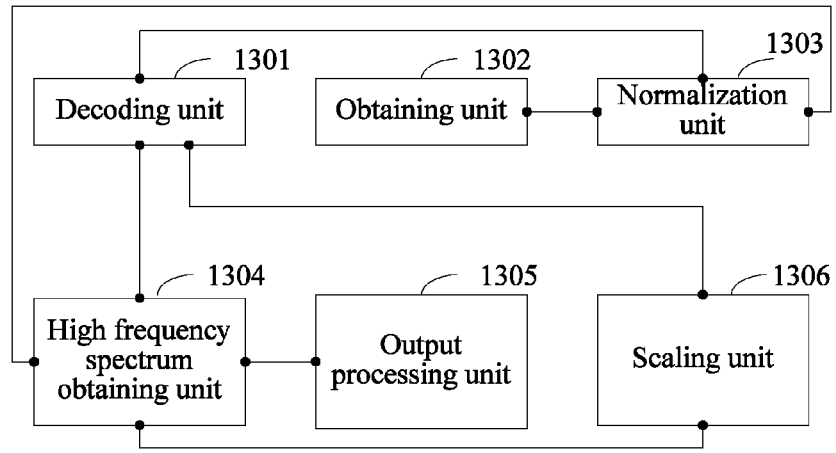
FIG. 13 is a simplified block diagram of a device for decoding a high frequency signal according to another embodiment of the present invention.

FIG. 13 is a simplified block diagram of a device for decoding a high frequency signal according to another embodiment of the present invention, and the embodiment includes a decoding unit 1301, an obtaining unit 1302, a normalization unit 1303, a high frequency spectrum obtaining unit 1304, an output processing unit 1305, and a scaling unit 1306.

The decoding unit 1301 is configured to obtain signal type information and frequency information of a high frequency signal of a current frame by decoding. When the high frequency signal of the current frame is a transient signal, the frequency information obtained by the decoding unit 2101 includes global energy information or amplitude information of the high frequency signal of the current frame.

The obtaining unit 1302 is configured to obtain a high frequency excitation spectrum of the current frame.

The normalization unit 1303 is configured to determine normalization length according to the signal type of the high frequency signal of the current frame obtained by the decoding unit 1301 and low frequency signal information, and obtain a normalized high frequency excitation spectrum by normalizing the high frequency excitation spectrum obtained by the obtaining unit 1302 according to the normalization length.

The high frequency spectrum obtaining unit 1304 is configured to modify the normalized high frequency excitation spectrum obtained by the normalization unit 1303 by using the frequency information obtained by the decoding unit 1301, and obtain a high frequency spectrum.

The output processing unit 1305 is configured to obtain an output signal obtained by using the high frequency spectrum of the current frame obtained by the high frequency spectrum obtaining unit 1304, and output the output signal.

The scaling unit 1306 is configured to scale the global energy information or amplitude information obtained by the decoding unit 1301 when the high frequency signal of the current frame obtained by the decoding unit 1301 is a transient signal. At the moment, specifically, the high frequency spectrum obtaining unit 1304 can modify the normalized high frequency excitation spectrum obtained by the normalization unit by using the global energy information or amplitude information scaled by the scaling unit 1306.

In view of the above, in this embodiment, when the current frame is a transient signal, the global energy information or amplitude information of the high frequency signal of the current frame is scaled before further processing, so that a pre-echo or a post-echo of the transient signal is reduced, and the performance of the transient signal can be further improved.

Information exchange between modules in the above devices and systems, and implementation processes are based on the same idea as the methods according to the embodiments of the present invention are, the description of the methods according to the embodiments of the present invention can be referred to for details, and the details are not discussed herein.

Those of ordinary skill in the art should understand that all or a part of the steps of the methods according to the embodiments of the present invention may be implemented by a computer program instructing relevant hardware. The program may be stored in a computer readable storage medium. When the program is run, the steps of the method according to the embodiments of the present invention are performed. The storage medium may be a magnetic disk, an optical disk, a Read-Only Memory (ROM), or a Random Access Memory (RAM).

The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for encoding a high frequency signal, comprising:
   determining a signal type of the high frequency signal of a current frame;
   when the high frequency signal of the current frame is non-transient and the high frequency signal of a previous frame is transient, smoothing and decreasing a time envelope of the high frequency signal of the current frame to obtain a processed time envelope of the high frequency signal of the current frame; and
   quantizing and encoding the processed time envelope, frequency information, and signal type information of the high frequency signal of the current frame,
   wherein the quantized and encoded signal type information indicates that the high frequency signal of the current frame is transient.

2. The method according to claim 1, further comprising:
   when the high frequency signal of the current frame is transient, quantizing and encoding the time envelope, the frequency information, and the signal type information of the high frequency signal of the current frame.

3. The method according to claim 1, further comprising:
   when both the high frequency signal of the current frame and the high frequency signal of the previous frame are non-transient, quantizing and encoding the frequency information, and the signal type information of the high frequency signal of the current frame.

4. The method according to claim 3, further comprising:
   determining specific classes of the non-transient signal; and
   quantizing and encoding the specific classes of the non-transient signal.

5. The method according to claim 1, wherein the smoothing and scaling the time envelope of the high frequency signal of the current frame to obtain the processed time envelope of the high frequency signal of the current frame comprises:
   forming the processed the time envelope of the high frequency signal of the current frame by combining a time envelope of the high frequency signal of a second half frame of the previous frame and a smoothed and scaled time envelope of the high frequency signal of a first half frame of the current-frame.

6. The method according to claim 1, wherein the determining the signal type of the high frequency signal of the current frame comprises:
   dividing a full frequency or high frequency time domain signal of the current frame into at least two sub-frames;
   calculating energy information or amplitude information of each of the sub-frames;
   judging whether the energy information or amplitude information of a current sub-frame is greater than a first preset multiple of the energy information or amplitude information of a previous sub-frame, wherein the first preset multiple is greater than 1; and determining the high frequency signal of the current frame as a transient signal when the energy information or amplitude information of the current sub-frame is greater than the first preset multiple of the energy information or amplitude information of the previous sub-frame; and determining the high frequency signal of the current frame as a non-transient signal when the energy information or amplitude information of any sub-frames of the current frame is smaller than or equal to the first preset multiple of the energy information or amplitude information of a previous sub-frame of the sub-frame.

7. The method according to claim 6, wherein before the determining the high frequency signal of the current frame as the transient signal, the method further comprises:

calculating energy information or amplitude information of sub-frames in the first half frame of a next frame;

obtaining minimum energy information or amplitude information from the energy information or amplitude information of all sub-frames that are behind a sub-frame of the current frame and the energy information or amplitude information of the sub-frames in the first half frame of the next frame, wherein the sub-frame has maximum energy information or amplitude information in the current frame;

judging whether the energy information or amplitude information of the current sub-frame is greater than or equal to a second preset multiple of the minimum energy information or amplitude information, wherein the second preset multiple is greater than 1; and determining the high frequency signal of the current frame as the transient signal when the energy information or amplitude information of the current sub-frame is greater than or equal to the second preset multiple of the minimum energy information or amplitude information.

8. The method according to claim 6, wherein before the determining the high frequency signal of the current frame as the transient signal, the method further comprises:

judging whether a spectral tilt of the current frame is smaller than or equal to a first threshold value; and determining the high frequency signal of the current frame as a transient signal when the spectral tilt of the current frame is smaller than or equal to the first threshold value.

9. The method according to claim 1, wherein the frequency information comprises frequency envelopes of the high frequency signal of the current frame, and the method further comprises:

scaling the frequency envelopes of the high frequency signal of the current frame, before the quantizing and encoding the frequency information of the high frequency signal of the current frame; and quantizing and encoding the frequency information of the high frequency signal of the current frame, wherein the frequency information comprises the scaled frequency envelope of the high frequency signal of the current frame.

10. The method according to claim 1, wherein the frequency information comprises global energy information or amplitude information of the high frequency signal of the current frame, and the method further comprises:

scaling the global energy information or amplitude information of the high frequency signal of the current frame, before the quantizing and encoding the frequency information of the high frequency signal of the current frame; and quantizing and encoding the frequency information of the high frequency signal of the current frame, wherein the frequency information comprises the scaled global energy information or amplitude information of the high frequency signal of the current frame.

11. A method for encoding a high frequency signal, comprising:

dividing a full frequency or high frequency time domain signal of a current frame into at least two sub-frames;

calculating energy information or amplitude information of each of the sub-frames;

calculating energy information or amplitude information of sub-frames in the first half frame of a next frame when the energy information or amplitude information of any one of the sub-frames of the current frame is greater than a first preset multiple of the energy information or amplitude information of a previous sub-frame of the sub-frame;

obtaining minimum energy information or amplitude information from energy information or amplitude information of all sub-frames that are behind a sub-frame of the current frame and the energy information or amplitude information of the sub-frames in the first half frame of the next frame, wherein the sub-frame has maximum energy information or amplitude information in the current frame;

judging whether the maximum energy information or amplitude information is greater than or equal to a second preset multiple of the minimum energy information or amplitude information, wherein the second preset multiple is greater than 1, and the first preset multiple is greater than 1; and determining a high frequency signal of a current frame as a transient signal when the maximum energy information or amplitude information of the sub-frame is greater than or equal to the second preset multiple of the minimum energy information or amplitude information, and quantizing and encoding time envelopes, frequency information, and signal type information of the high frequency signal of the current frame.

12. The method according to claim 11, wherein before the determining the high frequency signal of the current frame as the transient signal, the method further comprises:

judging whether a spectral tilt of the current frame is smaller than or equal to a first threshold value; and determining the high frequency signal of the current frame as the transient signal when the spectral tilt of the current frame is smaller than or equal to the first threshold value.

13. A method for encoding a high frequency signal, comprising:

dividing a full frequency or high frequency time domain signal of a current frame into at least two sub-frames;

calculating energy information or amplitude information of each of the sub-frames;

judging whether a spectral tilt of the current frame is smaller than or equal to a first threshold value if the energy information or amplitude information of any one of the sub-frames of the current frame is greater than a first preset multiple of the energy information or amplitude information of a previous sub-frame of the sub-frame, wherein the first preset multiple is greater than 1;

calculating energy information or amplitude information of sub-frames in a first half frame of a next frame;

obtaining minimum energy information or amplitude information from the energy information or amplitude information of all sub-frames that are behind a sub-frame of the current frame and the energy information or amplitude information of the sub-frames in the first half frame of the next frame, wherein the sub-frame has maximum energy information or amplitude information in the current frame;

judging whether the maximum energy information or amplitude information is greater than or equal to a second preset multiple of the minimum energy information or amplitude information, wherein the second preset multiple is greater than 1; and determining the high frequency time domain signal of the current frame as a transient signal when the maximum energy information or amplitude information is greater than or equal to the second preset multiple of the minimum energy information or amplitude information.

14. A device for encoding a high frequency signal, comprising:

a determination unit, configured to determine a signal type of a high frequency signal of a current frame; and an encoding processing unit, wherein the encoding processing unit communicatively coupled to the determination unit, the encoding processing unit is configured to smooth and decrease time envelopes of the high frequency signal of the current frame, obtain time envelopes of the high frequency signal of the current frame to be encoded, when the determination unit determines that the high frequency signal of the current frame is a non-transient signal, but a high frequency signal of the previous frame is a transient signal, and quantize and encode the time envelopes of the high frequency signal of the current frame to be encoded, and frequency information and signal type information of the high frequency signal of the current frame, wherein signal type information of a transient signal is used when the signal type information of the high frequency signal of the current frame is quantized and encoded.

15. The device according to claim 14, wherein the encoding processing unit is further configured to quantize and encode the time envelopes, the frequency information and the signal type information of the high frequency signal of the current frame when the determination unit determines that the high frequency signal of the current frame is transient.

16. The device according to claim 14, wherein the encoding processing unit is further configured to quantize and encode the frequency information and the signal type information of the high frequency signal of the current frame, when the determination unit determines that both of the high frequency signal of the current frame and a high frequency signal of the previous frame are non-transient signals.

17. The device according to claim 14, wherein the encoding processing unit is further configured to form the time envelopes of the high frequency signal of the current frame to be encoded with time envelopes of a second half frame of the previous-frame high frequency signal and the smoothed and scaled time envelopes of a first half frame of the-current frame high frequency signal after the time envelopes of the high frequency signal of the current frame is smoothed and scaled.

18. The device according to claim 14, wherein the determination unit comprises:

a division unit, configured to divide a full frequency or high frequency time domain signal of the current frame into at least two sub-frames;

a calculation processing unit, configured to calculate energy information or amplitude information of each of the sub-frames of the current frame obtained by the division unit;

a judgment unit, configured to judge whether the energy information or amplitude information of a current sub-frame calculated by the calculation processing unit is greater than a first preset multiple of the energy information or amplitude information of a previous sub-frame; wherein the first preset multiple is greater than 1; and a type determination unit, configured to determine that the high frequency signal of the current frame is transient when the judgment unit judges that the energy information or amplitude information of the current sub-frame is greater than the first preset multiple of the energy information or amplitude information of the previous sub-frame, and to determine that the high frequency signal of the current frame is non-transient when the judgment unit judges that the energy information or amplitude information of each sub-frame of the high frequency signal of the current frame is smaller than or equal to the first preset multiple of the energy information or amplitude information of a previous sub-frame of the sub-frame.

19. The device according to claim 18, wherein the calculation processing unit is further configured to calculate energy information or amplitude information of sub-frames in the first half frame of a next frame, when the energy information or amplitude information of the current sub-frame is greater than the first preset multiple of the energy information or amplitude information of the previous sub-frame, and to obtain minimum energy information or amplitude information from the energy information or amplitude information of all sub-frames that are behind a sub-frame of the current frame and the energy information or amplitude information of the sub-frames in the first half frame of the next frame, wherein the sub-frame has maximum energy information or amplitude information in the current frame, wherein the judgment unit is further configured to judge whether the energy information or amplitude information of the sub-frame having the maximum energy information or amplitude information is greater than or equal to a second preset multiple of the minimum energy information or amplitude information found by the calculation processing unit, wherein the second preset multiple is greater than 1, and wherein the type determination unit is further configured to determine whether the high frequency signal of the current frame is transient when the judgment unit judges that the energy information or amplitude information of the current sub-frame is greater than the first preset multiple of the energy information or amplitude information of the previous sub-frame, and the energy information or amplitude information of the sub-frame having the maximum energy information or amplitude information is greater than or equal to the second preset multiple of the minimum energy information or amplitude information found by the calculation processing unit.

20. The device according to claim 19, wherein the judgment unit is further configured to judge whether a spectral tilt of the current frame is smaller than or equal to a first threshold value when the energy information or amplitude information of the sub-frame having the maximum energy information or amplitude information is greater than or equal to the second preset multiple of the minimum energy information or amplitude information found by the calculation processing unit;

wherein the type determination unit is further configured to determine whether the high frequency signal of the current frame is transient when the judgment unit judges that the energy information or amplitude information of the current sub-frame is greater than the first preset multiple of the energy information or amplitude information of the previous sub-frame, the energy information or amplitude information of the sub-frame having the maximum energy information or amplitude information is greater than or equal to the second preset multiple of the minimum energy information or amplitude information found by the calculation processing unit, and the spectral tilt of the current frame is smaller than or equal to the first threshold value.

21. The device according to claim 14, wherein the frequency information comprises global energy information or amplitude information of the high frequency signal of the current frame, wherein the encoding processing unit is further configured to scale the global energy information or amplitude information of the high frequency signal of the current frame when the determination unit determines that the high frequency signal of the current frame is transient, and to quantize and encode the frequency information of the high frequency signal of the current frame having the scaled global energy information or amplitude information of the high frequency signal of the current frame.

22. The device according to claim 14, wherein the frequency information comprises a frequency envelope of the high frequency signal of the current frame, wherein the encoding processing unit is further configured to scale the frequency envelope of the high frequency signal of the current frame when the determination unit determines that the high frequency signal of the current frame is transient, and to quantize and encode the frequency information of the high frequency signal of the current frame having the scaled frequency envelope of the high frequency signal of the current frame.

23. A device for encoding a high frequency signal, comprising:
a division unit, configured to divide a full frequency or high frequency time domain signal of a current frame into at least two sub-frames;
a calculation processing unit, configured to calculate energy information or amplitude information of each of the sub-frames, and energy information or amplitude information of sub-frames comprised in the first half frame of a next frame when a judgment unit judges that the energy information or amplitude information of any one of the sub-frames of the current-frame high frequency signal is greater than a first preset multiple of the energy information or amplitude information of a previous sub-frame of the sub-frame, and to obtain minimum energy information or amplitude information from the energy information or amplitude information of all sub-frames that are behind a sub-frame of the current frame and the energy information or amplitude information of the sub-frames in the first half frame of the next frame, wherein the sub-frame has maximum energy information or amplitude information in the current frame;

the judgment unit, configured to judge whether the energy information or amplitude information of a current sub-frame calculated by the calculation processing unit is greater than the first preset multiple of the energy information or amplitude information of the previous sub-frame, and whether the energy information or amplitude information of the sub-frame having the maximum energy information or amplitude information is greater than or equal to a second preset multiple of the minimum energy information or amplitude information found by the calculation processing unit, wherein the second preset multiple is greater than 1, and the first preset multiple is greater than 1;
a determination unit, configured to determine the high frequency signal of the current frame as a transient signal when the judgment unit judges that the energy information or amplitude information of the sub-frame having the maximum energy information or amplitude information is greater than or equal to the second preset multiple of the minimum energy information or amplitude information found by the calculation processing unit; and
an encoding processing unit, configured to quantize and encode time envelopes, frequency information, and signal type information of the high frequency signal of the current frame when the determination unit determines that the high frequency signal of the current frame is transient.

24. The device according to claim 23, wherein the judgment unit is further configured to judge whether a spectral tilt of the current frame is smaller than or equal to a first threshold value when the energy information or amplitude information of the sub-frame having the maximum energy information or amplitude information is greater than or equal to the second preset multiple of the minimum energy information or amplitude information found by the calculation processing unit, and wherein
the determination unit is further configured to determine whether a high frequency signal of the current frame is transient when the judgment unit judges that the spectral tilt of the current frame is smaller than or equal to the first threshold value.

25. A device for encoding a high frequency signal, comprising:
a division unit, configured to divide a full frequency or high frequency time domain signal of a current frame into at least two sub-frames;
a calculation processing unit, configured to calculate energy information or amplitude information of each of the sub-frames of the current frame divided by the division unit, wherein the calculation processing unit is further configured to calculate the energy information or amplitude information of the sub-frames in a first half frame of a next frame when a judgment unit judges that a spectral tilt of the current frame is smaller than or equal to a first threshold value, and obtain minimum energy information or amplitude information from the energy information or amplitude information of all sub-frames that are behind a sub-frame of the current frame and the energy information or amplitude information of the sub-frames in the first half frame of the next frame, wherein the sub-frame of the current frame has maximum energy information or amplitude information in the current frame;
the judgment unit, configured to judge whether energy information or amplitude information of any one of the sub-frames of the current frame calculated by the calculation processing unit is greater than a first preset multiple of energy information or amplitude information of a previous sub-frame, and whether a spectral tilt of the current frame is smaller than or equal to a first threshold value if the energy information or amplitude information of any one of the sub-frames of the current frame is greater than the first preset multiple of the energy information or amplitude information of the previous sub-frame of the sub-frame, wherein the first preset multiple is greater than 1, wherein the judgment unit is further configured to judge whether the energy information or amplitude information of the sub-frame having the maximum energy information or amplitude information is greater than or equal to a second preset multiple of the minimum energy information or amplitude information found by the calculation processing unit, and wherein the second preset multiple is greater than 1;

a determination unit, configured to determine a high frequency signal of the current frame as a transient signal when the judgment unit judges that the spectral tilt of the current frame is smaller than or equal to the first threshold value and when the judgment unit judges that the energy information or amplitude information of the sub-frame having the maximum energy information or amplitude information is greater than or equal to the second preset multiple of the minimum energy information or amplitude information found by the calculation processing unit and an encoding processing unit, configured to quantize and encode time envelopes, frequency information, and signal type information of the high frequency signal of the current frame when the determination unit determines that the high frequency signal of the current frame is transient.

* * * * *